US006356937B1

(12) United States Patent
Montville et al.

(10) Patent No.: US 6,356,937 B1
(45) Date of Patent: Mar. 12, 2002

(54) INTEROPERABLE FULL-FEATURED WEB-BASED AND CLIENT-SIDE E-MAIL SYSTEM

(76) Inventors: David Montville; Adam Montville, both of 1127 W. George St., Chicago, IL (US) 60657

( * ) Notice: Subject to any disclaimer, the term of this patent is extended or adjusted under 35 U.S.C. 154(b) by 0 days.

(21) Appl. No.: 09/347,361

(22) Filed: Jul. 6, 1999

(51) Int. Cl.[7] .............................................. G06F 13/00
(52) U.S. Cl. ..................... 709/206; 709/219; 709/329
(58) Field of Search ................................. 709/201, 202, 709/203, 204, 205, 206, 217, 219, 223, 225, 227, 328, 329

(56) References Cited

U.S. PATENT DOCUMENTS

| 5,638,446 A | * | 6/1997 | Rubin ......................... 380/25 |
| 5,809,242 A | * | 9/1998 | Shaw et al. .................. 709/217 |
| 5,850,442 A | | 12/1998 | Muftic |
| 5,877,759 A | * | 3/1999 | Bauer ......................... 345/339 |
| 5,961,602 A | * | 10/1999 | Thompson et al. .......... 709/229 |
| 5,974,446 A | * | 10/1999 | Sonnenreich et al. ....... 709/204 |
| 6,096,096 A | * | 8/2000 | Murphy et al. ............... 717/11 |
| 6,108,687 A | * | 8/2000 | Craig .......................... 709/203 |

OTHER PUBLICATIONS

Screen Print of <ziplip.com>, "The ZipLip Solution", dated Jun. 2, 1999, 9 pages (numbered).
Screen Print of <hushmail.com>, "hushmail", dated May 28, 1999, 7 pages (hand numbered).
Microsoft, "Planning and Deploying Outlook Web Access", copyright 1999, 23 pages, hand numbered.

* cited by examiner

Primary Examiner—Viet D. Vu
(74) Attorney, Agent, or Firm—Chapman and Cutler

(57) ABSTRACT

A full-featured e-mail system is used in both Internet-based and client-side (personal computer) forms. In each form, either basic e-mail service is provided to system subscribers or a secure, premium service with authentication, concealment, integrity, and non-repudiation functions for electronic messaging services is provided. In either form and at either level of service, subscribers can work off-line on their own computers with proprietary software loaded or, alternatively, on-line on any computer with an Internet connection. The system is interoperable, to preserve security, with all S/MIME compliant software applications, even for those users not subscribing to a service implementing the disclosed system. Digital certificates can be provided as a security service of the disclosed system, rather than requiring a second source with separate verification procedures. As additional optional features, the subscriber can control compression of outgoing attachment files, rather than having that function absent or operate in some automatic way. Decompression of such file attachments when received occurs automatically for subscribers, without having to invoke a different program or system. Interactive help features, book hierarchy uniformity for messages, accounts, certificates, virus warnings, and dual naming capability are also provided and available to subscribers in both the Web-based and the client-side application forms disclosed herein, and in both basic and premium service levels.

10 Claims, 8 Drawing Sheets

INTEROPERABLE FULL-FEATURED WEB-BASED AND CLIENT-SIDE E-MAIL SYSTEM

FIELD OF THE INVENTION

The present invention relates to systems and methods for providing electronic messages and other communications using the Internet or World Wide Web ("Web") and a variety of personal and other computers available to different subscribers and users.

BACKGROUND OF THE ART

Most all persons that are engaged in commerce and/or in any sort of interpersonal relations are, by 1999, very well familiar with "e-mail" as a form of virtually-instant, written communication using the Internet and the World Wide Web. Many millions of people in the US and abroad now have access to computers they may use at home, at work, at school (from grade-school to college), at public libraries, at "cyber-cafés", at office services centers or stores, at colleagues' offices and homes, and at myriad other places. On such computers they can compose and send or receive e-mail messages using a modem, an Internet Service Provider ("ISP"), and an e-mail program either loaded into the computer or provided, often free, by the ISP or another Web host. Eudora® is a commercial e-mail program loaded onto a user's computer (i.e., "client-side") for composing and sending and receiving e-mail. Client-side programs are often required for use at colleges, allowing students to work off-line and then dial in to the central server just to upload and download their messages. Hotmail® and many other e-mail systems reside on servers accessed form the Internet, such as those at msn.com, and can be accessed only while on-line with the e-mail system server via the Internet. However, a user must be at his or her own computer to use the client-side application, and has no access to such e-mail otherwise, as while travelling without the computer. Further, a user relying on Web-based e-mail can work on the e-mail system from any computer with an Internet connection, but only while connected to the Internet and incurring telephone and other charges.

No commercial e-mail service is known to provide both on-line and client-side services that are similar to one another in use. A need exists for a subscriber to be able to work selectively either (1) from his or her own computer using personal settings, information, and files, or alternatively and equally well, (2) from any other computer through a server that can access the user's "home" server and still have available the user's personal settings, information, and files.

Security is also a need for electronic messaging. Messages and attachments are typically sent between computers and servers and between servers over non-secure lines, and stored on intermediate servers as they are routed to their destinations. Messages are sent in multiple "packets", so that not all of a message will go the same route to its destination server, thus providing some inherent security in the Internet system. However, messages and attachments stored on the origin and destination servers are vulnerable to snooping by persons with knowledge of computer intrusion tactics. Encryption techniques are known, whereby a subscriber may encrypt his or her text before it goes to the origin server and the text stays encrypted until it reaches the recipient's computer, where it is displayed as plain text without further action by the user. Complete security systems for electronic messaging require also, however, additional features of authentication of the sender's identity, integrity of the message and attachments as against modifications in transit, and assurance against repudiation by the sender. None of these three added security features is available on any known Web-based e-mail system, although some client-side systems provide them.

Many security standards and algorithms are available for use in secure messaging. S/MIME, SSL, and X.509 standards are used in some secure client-side systems but not in any known Web-based system, except that SSL (Secure Socket Layer) is used in two recently released commercial products, noted below. Many security algorithms are known and used in secure client-side e-mail systems, including 3-DES, Diffie-Hellman, DSS, MD5, RC2/40, RSA, and SHA-1; none of these is used in any Web-based application, save one of the recent commercial products. That product uses Diffie-Hellman and a further algorithm called Blowfish.

Useful e-mail systems provide additional features, besides simple messaging, that are helpful and desirable. Permitting address book(s), attachments, downloading of messages, and filing of messages into separate folders are typically allowed on some Web-based and most client-side systems. Features of checking multiple e-mail accounts and affording universal access from any computer are provided by Web-based systems but not by client-side systems. Typically, when users want help on a particular subject or action, they must obtain assistance from a menu or sub-menu, then search the help listing for the appropriate subject. Often, these help menus are inadequate or confusing or don't even try to offer the information the user requires. Virus warnings and dual naming procedures for log-in are known but not commonly used.

Very recently, two secure, Web-based e-mail systems have appeared commercially, under names of ZipLip and Hush-Mail. Both of these systems provide concealment or privacy features, but neither includes the three other data security features of authentication, integrity, and non-repudiation. They use Secure Socket Layer (SSL) security standards for encrypting messages in transit. HushMail uses the Diffie-Hellman algorithm (which is recognized in the S/MIME standard) as well as the Blowfish algorithm (which is not); ZipLip uses none. Neither system permits message download or multiple e-mail account checking, but both permit universal access from any computer with Internet access. ZipLip permits attachments, while HushMail does not. HushMail has address book and message folder features not in ZipLip, and ZipLip permits attachments whereas HushMail does not. Neither system is interoperable with other systems, but one must use the ZipLip or the HushMail systems to access messages developed within those systems.

Microsoft has recently offered a Web-based tool referred to as Outlook Web Access ("OWA"), as a part of the Microsoft Exchange server. Included already in Microsoft Exchange has been "Outlook Client" ("OC"), a full-featured, client-side e-mail software application, which supports the S/MIME standard. The OWA program permits a subscriber to access his or her messages residing on an OC server for sending or receiving same from over the web, but there is no access while on OWA to a subscriber's personal information, files, or settings. OWA is not S/MIME compatible, so the client-side and Web-based capabilities and experiences are very different.

Thus, no known e-mail system or service, Web-based or client-side, offers features of compression of attachments on demand, an integrated certificate authority and service provider, both Web-based and client-side access, an interactive help system, a virus warning system, and dual-naming log-ins, built into the system. Rather, such features and functions must be accessed and accomplished if possible by going to other programs, slowing a user's electronic messaging procedure greatly.

SUMMARY OF THE INVENTION

The present invention provides a robust, full-featured electronic messaging system with combined Web-based and client-side access that works equally well both from a subscriber's own computer with proprietary software or from any other computer connected to the Internet, with only very small differences in appearance and operation. Either way of access allows use of all features of the invention, including all security features noted below if the Internet connection is suitable.

The present invention provides both a basic form of service, both Web-based and client-side, and also a premium, secure level of service with all four of the security features of authentication, concealment, integrity, and non-repudiation, when used from the subscriber's computer or with a suitable Internet access.

The present invention permits inter-exchange of electronic messages with others that are not subscribers to the present system. For a subscriber to send a secure message to a person not a subscriber, the user need only be sure that the user's server and computer are set up to use the S/MIME protocol.

The present invention provides additional important features of multiple account checking, universal access, attachment compression on demand and automatic decompression, integrated certificate authority and e-mail service, interactive help, a uniform hierarchy for books of messages, e-mail accounts, and certificates, a virus warning system, and dual-naming log-in protections. All are useable from the subscriber's own computer, using the software system of the invention, and alternatively from any computer with suitable Internet access, using a password or -phrase to access the subscriber's own information, files, and setup.

The method of the present invention provides for programming both a Web-based server and a personal computer application with an e-mail messaging service configured to interact with and to shadow each other as to personal information, settings, and files of an individual one of said subscribers. The method includes steps of storing the personal information, settings, and files of a subscriber both on the Web-based server and on a personal computer running the application. Then the subscriber may access his or her files off-line solely through the personal computer and may alternatively access the files on-line through any computer able to communicate with the server. Access is then allowed to the messaging service via the server for a subscriber's sending and receiving electronic messages.

The present invention further provides for a digital certificate service with the messaging service. The Web-based form of messaging service is made secure against interception of messages. A subscriber can access the server of the messaging service from a personal computer using the Web-based form of service through an S/MIME compliant application to connect between the computer and the server. In a Web-based environment, a digital signature is provided to an authorized recipient, the signature verifying the identity of the sender, the integrity of the message, and the fact of the sending by the sender. The user is given control over whether or not to compress the file size of each outgoing attachment to a message; for subscribers, the decompression of each compressed attachment happens automatically when a subscriber opens it. Interactive help screens are provided on each subscriber's computer, both on-line through any computer and off-line if used through the subscriber's computer. Each of these help screens is displayed as it becomes pertinent to the task being then executed by the subscriber. The subscriber may turn any of these help screens on and off, however. A substantially uniform book hierarchy is provided for messages received and messages sent, e-mail accounts, and certificates available to the subscriber. A warning of possible virus contamination of attachments to a message is provided. Dual naming capability is available in the invention for more secure log-in, by requiring a log-in name as well as a user name upon log-in.

THE PREFERRED EMBODIMENTS

The present invention combines network/server architecture and, in one embodiment, a privacy-enabled e-mail application. This application, here called "EMC" for short, allows any e-mail service provider to offer privacy-enhanced e-mail to its users. EMC was developed with the following goals in mind:

1. The architecture must be robust and scalable in terms of cost and security,
2. The architecture must provide a standard level of security in any configuration,
3. The architecture must provide an overall security package to the client and the end-user,
4. The e-mail application must be universally applicable, to fill any user's needs,
5. The e-mail application should incorporate many useful features that are not found in currently existing e-mail applications, and
6. The e-mail application should be easy to learn and use, and should provide continuous feedback to the user.

The architecture of the invention has a minimum set of requirements that allow ISP's the opportunity to implement EMC with little or no additional overhead costs. This minimum set of requirements can be utilized to provide a robust platform from which to provide secure e-mail services. EMC attains goals nos. 1 and 2 above through the hardware/software specification of the EMC network. This network is scalable in terms of the number of servers used, the type of connections used between servers, and the backup capability of the servers. This underlying architecture uses state-of-the-art technology to provide the means by which EMC fulfills goals nos. 3–6 of the previous list.

The architecture of EMC was designed for three purposes:
1. To securely provide certificates to end-users,
2. To securely provide a Certificate Repository, and
3. To securely provide the mail server for the e-mail applications specified for use with EMC.

These three purposes are met by the architecture specification, which provides these services securely by strategically using firewalls, secure routers, public key encryption, and specific authentication protocols. This design offers an overall security package for the service provider and the end-user. Fulfillment of these goals is achieved through implementation of the e-mail application as in the implementation and system deployment example of FIG. 2.

Figure 2:
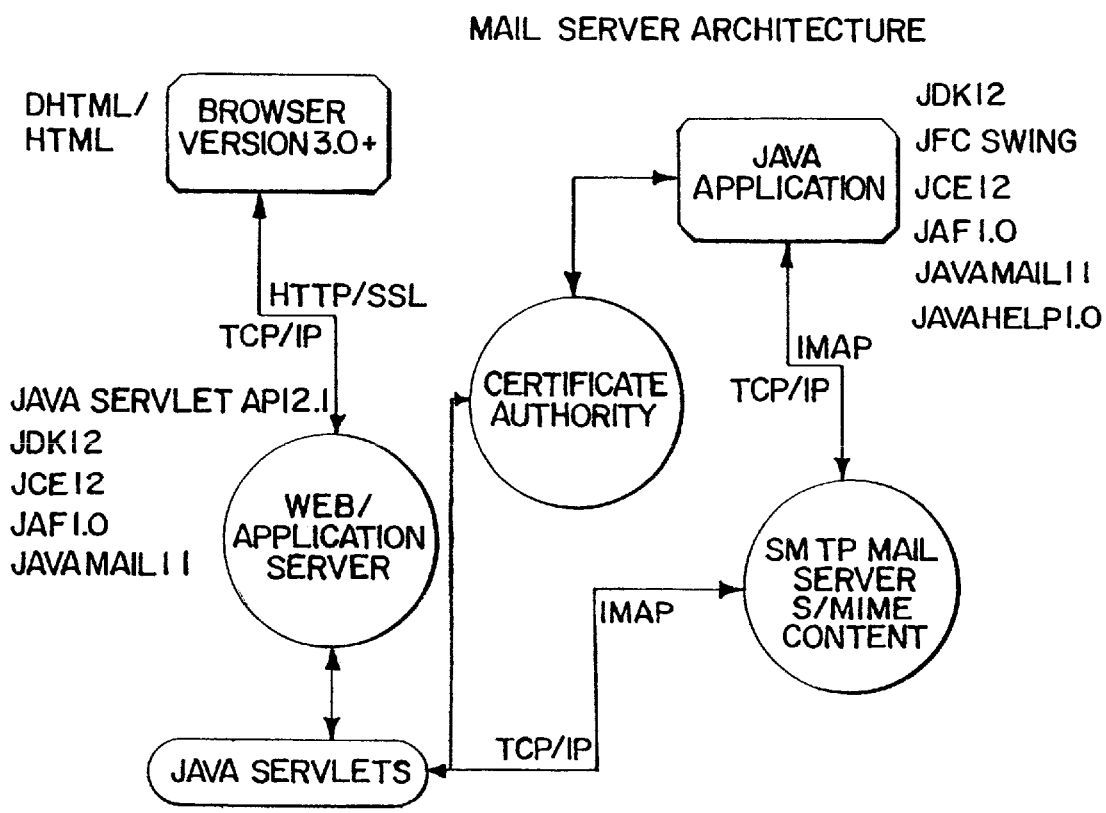
FIG. 2 is a detailed depiction of the architecture of the system, showing functional servers and connections.

As shown in the system architecture diagram of FIG. 2, a subscriber to EMC will use a Web browser of recent vintage in conjunction with Java and other applications on his/her own computer, whether a desk-top PC, a laptop PC, an Apple machine, a workstation, etc. The application, in any of various forms available, contains all the functionality of the client-side EMC program, loaded to the hard drive of the subscriber's computer as from a CD-ROM or down-loaded and saved for execution from the Internet. The mail server and the Web/Application server cooperate at the server level through Servlets as shown to provide the functionality needed at the server level, and to cooperate with the subscriber through the browser as controlled through the EMC application, as embodied in Java or a similar language. The Application and the e-mail server cooperate with a Certificate Authority to generate a certificate for communications and to keep that certificate for use when needed by the application either at the computer or the server level. Communications among the different entities are conducted over lines secured by the various protocols shown, or others of similar effect.

In order to create universal appeal, the e-mail application provides two implementation forms and two levels of service. The first form is a Web-based implementation that uses distributed computing technology to provide e-mail service without downloading by the end user. The second implementation form is an application that is loaded on or downloaded to the subscriber's personal machine and run locally. The ability to offer the two complimentary forms for implementation is paramount to EMC's goal of providing robust e-mail services. The Web-based form permits subscribers who do not have their own computer, who travel, or who otherwise use different computers to access and use these e-mail services. The client-side application is used by subscribers who do not want to be online for long periods for composing and reading messages. The ability of a single subscriber to use either of these implementations alternatively, on the same account, provides universal access to versatile e-mail services.

The Web-based form of the invention uses distributed computing technology to provide full-featured e-mail services to an end-user subscriber from any suitable computer that is connected to the Internet and has an Internet browser. Currently, full-featured e-mail with privacy enhancements is available only in those e-mail applications that are run on the end-user's local machine. The drawback of this approach is that the user needs to be at that machine in order to use the e-mail application, and thus have all the expected e-mail features and also secure communications. The Web-based form of this invention provides secure communication to or from any place the subscriber is located.

The two forms of the invention have the following features that are unique to EMC's architecture:

1. Fully integrated, controllable compression/decompression;
2. The Web-based form is capable of using privacy enhancements as provided by X.509 certificates;
3. A context-sensitive Interactive Help Panel for interfacing continuously with the subscriber as the program is used; and
4. A "Book" system as is typically applied to e-mail address organization in other e-mail applications is extended to organize message lists, account lists, and certificates.

Several of the above features merit discussion. First, most e-mail applications (Web-based or client-based) do not provide the end user with optionally useable compression/decompression tools. Rather, the user must manipulate the file to be compressed/decompressed in an application separate from the e-mail. A few e-mail applications automatically compress outgoing message attachments that are of a particular size and/or quantity, but the feature cannot be turned off or varied. The present invention integrates compression technology and places control with the end user or subscriber.

The privacy-enhanced Web-based e-mail feature, at a premium level of service above a basic level, should provide all four of the important attributes of security: concealment of the message contents against snooping by others, integrity of the message as against changes in what the sender sent, authentication that the person or user named actually did send the message, and non-repudiatability by the sender that the message was indeed his or hers.

The program warns when messages or their attachments may contain viruses, worms, and other undesired programs that may harm the computer or its files. The user can then take appropriate action, including scanning with a detection program to confirm the presence and type of virus present, and to destroy the virus identified, by then taking appropriate further steps.

The program further permits increased security by adding a further layer of name protection. Currently, the user name and log-in name are the same, although they need not be. EMC is set up to require separate entry of the user name, log-in name, and password.

The Interactive Help Panel of the invention extends the known concept of such computer aids. The Interactive Help Panel continuously displays to the user suggestions and "tips" for the current action the user is performing. Thus, the Interactive Help Panel is context sensitive, i.e., it "knows" where the user is in the program and what the user is trying to accomplish, and it continuously offers instruction on how to complete the task.

The invention offers a "book based organization" that is modeled upon the conventional address book. Received/draft messages, user accounts, and digital certificates are, according to the invention, organized as separate "books." Thus, EMC provides an Address Book, Account Book, Certificate Book, and a Message Book. This innovation provides the subscriber with a familiar way of viewing different information.

Cryptography is the process of hiding information; that is, when something is encrypted it is rendered unreadable to all but certain people who are able to see the underlying information. Two types of encryption are used today: public key and private key. Private key cryptography requires two users to share a secret key (i.e., only they know what the key is) and makes use of this common knowledge to hide correspondence and other data from would-be eavesdroppers. Public key cryptography provides each user with two keys. One key is publicly available, and the other is kept privately (i.e., no one else knows the key's value). In public key cryptography, concealment is achieved when one user encrypts a message using the intended recipient's public key. The recipient can then use his or her private key to decrypt the message. No person can decrypt the message except the user who possesses the private key that corresponds to the public key with which the message was encrypted.

Client-side e-mail messaging systems may use both public and private key encryption to conceal messages. This is primarily because public key encryption is much slower than private key encryption. As a result, a secret key is randomly generated and used to encrypt the outgoing message. Then, the secret key is encrypted with the public key cryptosystem, and the encrypted message is sent with the encrypted key. By themselves, cryptosystems are inadequate in the sense that anyone can encrypt a message to send to someone else without proving their identity; that is, it would be easy to forge an encrypted message to someone else. Requiring the use of digital signatures, below, combats this possibility.

A digital signature is a piece of information sent with a message that proves that the message originated from a particular person. It is analogous to a written signature, and is, in some situations, considered to be legally binding. Digital signatures serve for non-repudiation as well as verification functions.

The use of digital signatures and public key cryptography is powerful; however, it does have its flaws. If used without the proper structure, there is no way to identify the individual sending a message. In fact, anyone could sign and encrypt a message without ever revealing his or her identity. A digital certificate enables an individual sending a message to prove his/her identity, at least partially. A digital certificate contains a user's public information and a signature from a certificate authority (e.g., VeriSign, Inc.). Digital certificates and their use are standardized in the X.509 standard. When digital certificates are used, there is little question of validity, non-repudiatability, and integrity of sent messages.

In sum, there are four basic security issues in electronic communications: concealment, integrity, authentication, and non-repudiation. The solution to these problems is referred to as full digital security. The application of cryptography in its various forms addresses each of these concerns; however, the application must be appropriate for these concerns to be properly addressed. Digital signatures, if used properly, provide non-repudiation, authentication, and data integrity. Encrypting an entire message provides concealment. By using encryption and digital signatures properly, one can achieve a secure communication foundation with the only potential risk, besides the compromise of privately guarded information, e.g., private keys, being brute force attacks, but this depends largely upon the cryptosystem being used.

Several cryptographic algorithms are widely used today. The most common private key cryptosystem is the Federal Government's Data Encryption Standard ("DES") as specified in Federal Information Processing Standards Publication ("FIPS PUB") 96. DES is a private key cryptosystem, which means that any two parties wishing to communicate securely must share a common key. The data to be concealed is encrypted with this key, sent, and then decrypted with the same key. A variant of this standard is referred to as triple-DES or "3-DES". 3-DES typically uses two keys and three rounds in the following manner: first, the message is encrypted with the first key, then the result of the first round is decrypted with the second key, and, finally, the result of the second round is encrypted with the first key. DES, which is specified to have a key length of 56-bits, has recently been broken by brute force. However, 3-DES has not yet been broken. The most common public key cryptosystem is the Rivest, Shamir, and Adleman algorithm ("RSA"). It has not yet been broken, and is as strong as its key length (similar to DES in this respect).

A somewhat less powerful public key cryptosystem, presently useful for export purposes, is RC2/40, by the developers of RSA. It works with a 40-bit key, and is not considered secure. However, it can be exported without consent from the US government because its key length is so short.

Digital signatures are achieved by using a specific algorithm, and always use public key cryptography as a foundation. The Digital Signature Standard ("DSS"), also known as Digital Signature Algorithm ("DSA"), is specified in FIPS PUB 186-1. The DSA does not, however, sign the entire message. Rather, a message digest or hash is first created using a particular algorithm. Message digests are formed in fixed lengths and derived from an arbitrary length message in such a fashion that no two unequal messages will result in the same digest. DSA first computes the message digest of the message it wishes to sign, then encrypts the resulting hash value with the private key to create the signature. This signature is then appended to the message and sent as usual.

Two message digest algorithms are important here. The first is MD5, developed by Ron Rivest (of RSA fame). MD5 produces a digest quickly, but not necessarily very securely, as it has some known weaknesses. The second, and more important, hashing algorithm is the Secure Hash Algorithm ("SHA"). SHA is specified in FIPS Publication no. 180-1, and has no known weaknesses. SHA takes slightly longer to process information than MD5; however, the trade-off between time and security is well worth the wait. Furthermore, SHA is specified to work with DSA and the forthcoming ECDSA, below.

The state-of-the-art of digital signatures and cryptography relies upon elliptic curve cryptography ("ECC"), a public key cryptosystem. ECC offers greater security at a substantially lower key length than RSA or other public key cryptosystems. There are currently two identical draft standards (IEEE P1363[12] and ANSI X9.62[1]) that define the DSA for elliptic curves (ECDSA). Elliptic curve cryptography, given its strength-to-key-length-ratio, is the future of cryptography, and existing standards, such as the X.509 certificate standard, will aspire to accommodate various ECC algorithms in the future.

As an additional note, the National Institute of Standards and Technology ("NIST") is seeking a replacement for DES. This replacement will be selected from a pool of 15 candidate algorithms currently under review. The replacement is already known as the Advanced Encryption Standard ("AES"). AES is expected to be finalized early in the year 2000.

The Secure Multipurpose Internet Mail Extension ("S/MIME") protocol provides a secure overlay for the Internet mail standard MIME. MIME is an Internet standard documented in RFC's 2045–2049, providing extensions to the basic e-mail standard RFC 822. These extensions provide for greater flexibility and interoperability of existing e-mail applications as well as expanding the type of data that can be sent via e-mail. Secure MIME provides the capability to use certificates and a variety of cryptosystems. Currently, S/MIME supports the following cryptographic mechanisms: SHA-1, MD5, DSS, RSA, Diffie-Hellman, 3-DES, RC2/40. These cryptographic algorithms comprise a good set of cryptographic tools.

S/MIME provides a universal cryptography tool kit with which a user can enhance the privacy of e-mail correspondence. S/MIME is specified for using the X.509 v3 certificate standard, and uses this standard as a basis for forming trust among individuals. A centralized authority issues these certificates, thus providing a verifiable path of trust.

Central to many Internet services is the issue of user authentication. Authentication here refers to the ability to determine that a sender is who he/she claims to be, in that the sender is bound to the name used. A subtle distinction exists between this definition and other uses of "authentication", which may rather require proof that a user's identity is not false. Here, authentication only binds a single, unique user to the user name. That is, the user name relates to a particular person, who may remain anonymous. To authenticate the identity of an individual to whom a username belongs requires physical presence of that individual.

For a subscriber to log-on to EMC, a separate (i.e., non-certificate-based) authentication procedure is used, employing public key cryptography in accordance with FIPS PUB 196, ("Entity Authentication Using Public Key Cryptography"). Once the user is logged into the service, all requests are performed with Kerberos wrapped in IPSec protocol.

Kerberos is an authentication protocol that can be utilized by subscribers and other entities requesting services on a network. It is said to be scalable, but for the purposes of EMC, it needn't extend past a simple protocol level. Kerberos uses public key cryptography to authenticate users with an Authentication Server ("AS"), and a Ticket Granting Server ("TGS").

Kerberos was designed with the following implementation goals:
1. Secure: An eavesdropper should not be able to obtain any information that would allow impersonation. Kerberos should not be a weak link in the security chain.
2. Reliable: Kerberos should be implemented with redundancy in mind, to prevent denial of service attacks.
3. Transparent: Ideally, the user/entity being authenticated should not be aware that authentication is taking place, with the exception of a necessary user password.
4. Scalable: Kerberos was designed for a distributed, modularized world.

Thus, the model is scalable to numerous clients and servers.
This authentication scheme is typically used for user authentication, but is suitable for entity authentication as well. An entity is defined to be a process or server that requests service from another process or server.

A Ticket is similar to a certificate and contains information about the entity making the request and the nature of the request. Kerberos is designed to virtually eliminate any compromise of passwords and private keys, replay attacks, and other potential security risks. This does not mean, however, that Kerberos is flawless. Kerberos relies upon time synchronization between servers. If an attacker could somehow fool a server into believing the time was different than it was supposed to be, then the attacker could circumvent Kerberos. No authentication protocol is completely flawless.

On a basic level, the entity requesting a service sends a request to the authentication server, which replies with an encrypted Ticket. The Ticket is decrypted by the entity applying for services, and then sent to the TGS. The TGS then replies with a Ticket for the particular service requested and that Ticket is sent to the server from which services are requested.

Each local network using a Kerberos authentication system can be scaled with other networks implementing Kerberos. Each network is called a realm, and the multiple networks implementing Kerberos are referred to as Kerberi. That each realm can interoperate with the other is useful for the obvious reason that several smaller, modularized networks can communicate securely.

There are currently two versions of Kerberos in use, and they are competing for wider acceptance. These versions are Kerberos v4 and Kerberos v5. Version 5 is a major overhaul of v4, but the objectives are the same. Version 5 offers greater flexibility as to the environments in which it can be applied by enabling Tickets with more extensions than those in version 4. EMC is specified to use Kerberos v5.

Certificates adhering to the X.509 standard are those that are issued by a granting authority for use in secure e-mail and digital signatures. The X.509 standard has several different versions, the latest of which is version 3. Version 3 contains extensions that are not found in the previous versions and allows for greater messaging flexibility. Aside from defining the specific content of certificates, the X.509 standard also sets the stage for Certificate Authorities and how they are to implement the use and issuance of certificates. More precisely, X.509 specifies that an issuing authority must create a Certification Practice Statement, which defines various policies pertaining to the issuance and use of X.509 certificates.

Unfortunately, the above practice allows for wide policy variance between different issuing authorities. However, at least two groups are currently working on extending the X.509 standard to close some of the "holes" that are left to be filled, and to provide for a better standard. In particular the Public Key Information Exchange ("PKIX") is a working draft of the Internet Engineering Task Force and will be a superset of X.509. Another group, the Meta Certificate Group, is also seeking to expand on the X.509 standard. When the working drafts are implemented as standards, those entities employing X.509 certificates will easily transition to the new standard of choice.

Figure 3:
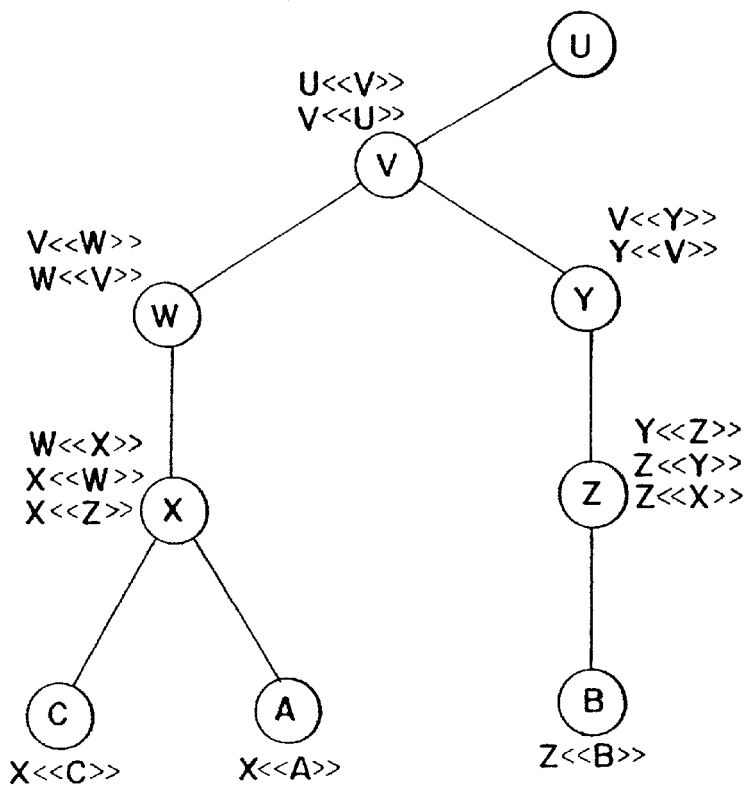
FIG. 3 is a depiction of the chain of certificates used in the system for verifying identity of the senders of messages in the system.

FIG. 3 represents a certificate chain that validates various certificates. The notation X<<Y>> is defined in the X.509 standard, and is read as X signs Y. The root must be a Certificate Authority. There can be many trees with many roots in existence and they will all be able to certify each other, provided that each root has signed the root of the other trees. That is to say that if two trees, say A and B, have distinct certificate chains and the CA (root) of each tree has signed the other CA's root certificate, any certificate on either tree (A or B) can be verified by any other certificate on either tree (A or B).

A Certificate Authority ("CA") provides a trustworthy certificate chain to users of the Internet. Certificates typically conform to X.509 standards. Furthermore, CA's are required, as stated in X.509, to create a Certification Practice Statement ("CPS"). The CPS is what defines a CA and its offerings. VeriSign, a PKI corporation that provides three levels of certification in a class system, provides the best example of a CA. The three certificate levels that VeriSign offers are class 1, class 2, and class 3. Class One certificates have the lowest secure authentication, and Class Three certificates have the highest level.

A CA should have differing levels of certificates; however, a three-tier class structure seems to be too confusing and complicated for EMC's purposes. Certificates provide for secure e-mail and non-repudiation: however, the true identity of the user on the other side of the communication is still unknown. Thus a two-tier class system should be all that is necessary. The lowest level of security a certificate should offer is that which binds an e-mail address and a credit card account to the user applying for a certificate. There is no guarantee that no credit card fraud is taking place, thus identity is not absolutely proven.

The second, and higher, class of certificate guarantees authentication of the user's true identity via physical identification. This means that the user applying for a level-two certificate needs to be identified with proper credentials (i.e., a passport or driver's license) by the CA or a licensed signatory. A particularly easy method of achieving this goal would be to have the user download and print a legally binding document (the document can contain a digital watermark to protect the integrity of the document) that the user can sign in the presence of a notary public or other official. The document is then physically sent (by courier or mail) to the issuing CA for confirmation. The approved applicant would receive the issued certificate in one of two ways. The certificate would either be distributed via password authenticated secure Web download, or it could be sent via certified mail or by some other trusted courier.

A Certificate Authority has several issues with which to be concerned. First is the concern over the secure delivery of private information over the Internet. This pertains to the distribution of approved certificates of any security class. A secure connection, either via a new dial-up number or via a secure Web page using SSL, must be established and appropriately used to distribute a new certificate. Second is the concern over the validity of the claim of identity made by an applicant. In other words, is the applicant really who he/she claims to be? Unfortunately, without physical appearance and credential checks, there is currently no cost-effective method to achieve valid authentication of identity by digital-only means. Third is the plausible lifetime of a certificate. By some mathematical models, the lifetime of a root certificate should only be about two weeks. By practice standards, however, the root certificate lasts for a year or longer.

The architecture of the present invention relies on each operator of the system (e.g., each ISP) being either an Issuing Authority (granted a license by the ultimate CA), or being the CA itself. The Certification Practice Statement ("CSP") of EMC's architecture requires that varying levels of true authentication be provided in a two-tier system, and that key generation, root certificate generation, and destruction of keys and root certificates be done on a FIPS 140-1 level four approved computer. Moreover, the CPS provides requirements for setting up the certificate service when implementing the EMC architecture. That is, when authorization is licensed to any issuing authority, the authority must provide proof that the architecture of EMC is in conformance to security guidelines as specified in the architecture layout and in the CPS. These requirements provide for cohesion among those issuing authorities affiliated with the certificate authority.

Essentially, the CPS is the central controlling point for EMC and is the doctrine by which EMC is implemented. The familiar VeriSign Certification Practice Statement provides an adequate foundation from which extensions can be made to provide a more comprehensive, authentication-friendly service. EMC provides two "levels" of confidence when generating its certificates. The lower level of confidence verifies the user's identity via digital information, and the higher level of confidence requires the user to sign a legal document in the presence of a notary public or similar officer for personal identification verification. The lower level of verification only binds a certificate to a particular e-mail address or password, whereas the higher level of verification binds the certificate, the e-mail address, and the actual identity of the individual. This is not necessarily foolproof, as an applicant presenting false identification to the notary public or other officer could circumvent even the highest level of verification.

Figure 4:
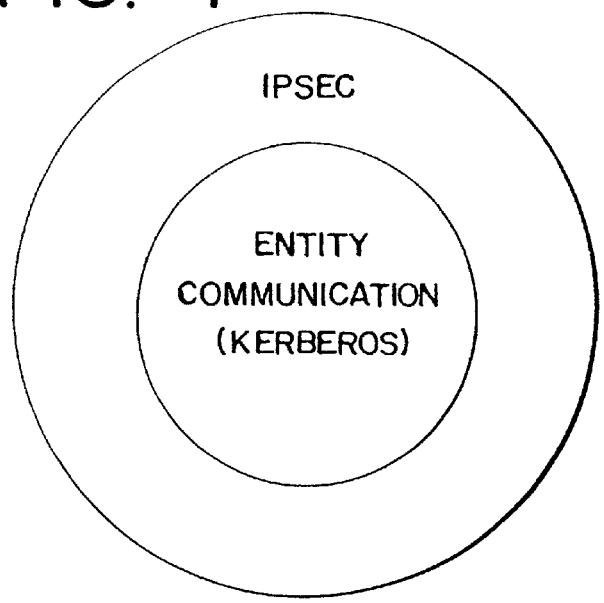
FIG. 4 is a depiction of the security system used in the invention for communications lines.

The EMC hardware architecture provides secure e-mail services from a safe, yet flexible source. Consideration is given to security, authentication, validation, and ease of use. The Architecture may consist of several servers: mail, certificate authority, web/application, and a servlet server (as shown in drawing FIG. 2). All servers communicate with Kerberos authentication wrapped in IPSec protocol, as in FIG. 4.

Secure communication between servers is accomplished by using IPSec, an Internet security protocol applicable to local area networks. IP Security specification is complex, but is well documented in the following RFC standards released by the Internet Engineering Task Force:

RFC 1825: An overview of a security architecture;

RFC 1826: Description of a packet authentication extension to IP;

RFC 1827: Description of a packet encryption extension to IP;

RFC 1828: A specific authentication mechanism; and

RFC 1829: A specific encryption mechanism.

The specification for IPSec is known to those of skill in the art. Differences exist between communications between servers and communications between a server or ISP and a user. The communication between the server and the user (e.g., sending e-mail) is handled by Kerberos, and the underlying communication between servers is handled with IPSec. See FIG. 4.

This security redundancy helps eliminate "sniffers" and other would-be attackers from snooping on communications. Furthermore, Kerberos virtually eliminates replay attacks, regardless of the underlying communication security. Perhaps the best way to understand the way different levels of security are engineered is to think of requests for service as being Kerberos, and communication of those requests as being handled by IPSec.

The EMC servers are functionally different from one another, thus each server has different operating requirements. The optimal operational requirements, as presently known, for the servers are listed below with brief justifications. These requirements are necessary to meet EMC's most secure specifications:

TGS: this server should be a dual processor (quad capable) system running a B2 trusted operating system. This is the server that grants Tickets to requesting entities. High processing speed is a requirement in that this server is often asked to do a lot of work in a short amount of time.

AS: this server also should be a dual processor system running a B2 trusted operating system. The authentication server need only be applied to once per session when using Kerberos v5, thus the server must be at least as fast as the TGS, and the TGS must be at least as fast as the AS. The trusted operating system is necessary because this server provides entity authentication.

PKS: this server should have dual processors, is quadruple processor capable, and is highly expandable in the number of hard-drives it can accommodate. It is important that this server be "hot swappable" so that new hard-drives can be added without an interruption of system service. Because this server houses the Certificate Revocation List, it, too, runs a B2 trusted operating system.

Mail: the mail server should be a quadruple processor machine with hot swappable disk expansion. Much information is continually changing on the drives of this machine, thus the processing speed needs to be high. Of similar importance is the level of the operating system for the mail server. As with the other servers, this server also uses a B2 trusted operating system. The combination of speed, flexibility, and trustworthiness creates an environment that is conducive to good business.

KCGS: this is the most critical server. This server must conform to level four security levels as specified in FIPS PUB 140-1. Furthermore, each of the two required machines should contain dual processors and be quad processor capable. There are periods when these machines are required to generate much mathematical data in short amounts of time; thus the processor speed is of the utmost importance. Storage space, however, is not a large concern. Sufficient storage is necessary to store any cryptographic files that are necessary for generating digital certificates.

Firewall: the firewall server is also of critical importance, whether there is a single firewall or a dual firewall configuration. The firewall is responsible for "filtering" incoming traffic as well as releasing outgoing traffic. As such, the firewall should be run on a quad processor machine. The firewall requires little in the way of hard-drive space, but a substantial amount of RAM. The firewall(s) conform to the B2 trusted system status.

Public Access: the public access server should be a dual processor machine. This server is the central location from which individuals check publicly available information and/or apply for digital certificates. The amount of hard drive space required by this server depends largely upon the amount of information to be stored on it. Because the Public Access server acts as an access point to critical server processes, e.g. certificate generation, it must reside on a B2 trusted system.

The above represents general requirements for the various servers to be provided in any given implementation of EMC. Each server should run on a B2 trusted operating system (as specified in the Department of Defense "Trusted Computer System Evaluation Criteria"). The amount of Random Access Memory ("RAM") is commensurate to the duties and processing needs of the particular server. Because some of the servers may be doing more or less work than others, the amount of RAM necessary varies between implementations. Similarly, the amount of hard disk storage needed to be available to each machine must be determined for each system, individually. Some servers, such as the mail server and PKS, require substantial amounts of space depending on the number of clients the particular implementation will support.

Where applicable, the server is highly expandable and/or extendable. As an example, the mail server will have the capability to expand as its user base grows. Once a mail server is at full capacity, another such server will need to be implemented, or a larger server will replace the existing one. In addition, each server must adhere to the requirements for server communication and entity authentication (IPSec and Kerberos).

The EMC e-mail application is available in two forms: Web-based application and client-side. The basic functionality of each implementation is the same.

The application is designed to operate as either an applet-like program that extends to the user's computer and is run through a Web browser, or as a downloadable application that runs exclusively on the user's machine. The application contains the following list of features to provide a comprehensive and unique product. The following basic functions are found in both implementations:

Users can receive mail from any existing POP3, IMAP, SMTP, etc. account;

Vacation reply ability;

Improved Address and Message Books;

Spell checking capability of outgoing messages;

HTML anchor linking (ability to invoke the default browser);

Multiple addresses, e.g., for various members of the family (secure communication with separate certificates only);

User definable appearance (e.g. wallpaper);

The ability to mark read messages as "new";

Read messages are automatically downloaded to the user's machine after a specified amount of time; and Print capability from the application.

Each implementation requires different handling of functionality in order to emulate these features; however, the differences between the overall look and feel of each implementation should go largely unnoticed by the subscriber. The e-mail application is designed to implement S/MIME messaging utilizing X.509 certificates.

The cryptographic modules in EMC are of security level four quality as defined in FIPS PUB 140-1:

"A Level 4 cryptographic module provides an envelope of protection around the cryptographic module. The intent of Level 4 protection is to detect a penetration of the device from any direction (rather than just attempts at the cover or door covered by Level 3 requirements) and respond by destroying critical information before it can be acquired. For example, if one attempts to cut through the cover of a cryptographic module, the attempt would be detected and all critical security parameters would be zeroed. Level 4 allows software cryptography in multi-user, multi-tasking systems when a B2 or equivalent trusted operating system is employed. A B2 operating system provides a large number of assurances of the correct operation of the security features of the operating system."

Essentially, the cryptographic module containing the software that produces authentication keys, certificate information, root keys, etc., should reside on a level B2 operating system. This makes reference to the Department of Defense Trusted Computer System Evaluation Criteria ("TCSEC", or "The Orange Book"). In addition to providing extra detection, environmental controls must be placed on the module. That is, the module should be able to check environmental conditions (i.e., heat) and to zero essential information upon experiencing threatening conditions, e.g., too high a temperature, or the module should be rigorously tested against such conditions.

The architecture of the EMC system provides security level four for the creation of digital certificates. This means that the machine, software, and any related hardware or software that is involved with the generation of keys, prime numbers, or any other portion integral to the creation of a digital certificate resides on a machine that meets the requirements to be certified for level four security as specified in FIPS PUB 140-1.

The EMC architecture uses a rich array of cryptographic, authentication, and other protection protocols. Most of these varying protocols have been standardized. These standards will undoubtedly evolve. Each standard chosen for its particular duty promises to evolve nicely and evenly, thus providing EMC with a probable vertical evolution of its own.

This invention is designed to provide users with secure message transmission via the X.509 certificate standard as implemented with Secure Multipurpose Internet Mail Extensions ("S/MIME").

This invention has many distinct features and functionalities. The invention is designed so that an Internet browser can run one form of the e-mail service, or another form can be loaded onto a user's local machine to be run as a standard application. Sufficient information is supplied in this specification to allow a developer to implement the invention.

The features are listed in a hierarchical fashion, thus providing a developer the necessary background to sufficiently modularize the implementation. The modularity provides for easier coding and testing of the features contained in the application. The invention is described from the user's point of view, thus providing invaluable insight for the developer. If consideration is always given to the user, then the final product will be a good one that users will enjoy and appreciate using.

This invention is an e-mail application consisting of many common e-mail features, as well as some invaluable new ones. The major features of the e-mail application are listed below:

Send and Receive messages, and Reply to and Forward messages
Stop or initiate vacation response program
Inbox modification
E-mail Account book modification
Application appearance modification
Enable or disable signature appendage
Address book modification
Message filters
Virus warning
Dual naming These are the primary features that create the functional foundation for the e-mail application. These features are further enhanced by adding the use of digital certificates (X.509), a built-in compression utility, and the overall dual functionality of being able to run through a browser or as a stand-alone application.

This application is designed with two general environments in mind. The first environment is that of an Internet browser, such as Netscape Navigator. In this sense, the application is to run through the browser in order to get to the user. The modular design of the application provides for simple transition between Web-based application usage and the second environment.

The environment first discussed is that of the Windows/Intel environment

This section lists the features of the application in detail. The format is an outline that places each feature either as a top feature of the application, or as a sub-feature of another feature. The highest features are those with the lowest number. These initial features are described as "level zero", and each successive level of sub-features increments this count. As an example, level four would be a feature located five tiers "down" in the hierarchy. The feature listing can be viewed as an upside-down tree where the root of the tree is at the top. In this case, the root of the tree is the application.

The following outlines present the application features from the user's point of view. Each major feature is listed with its sub-features below, and is followed by a paragraph further explaining the features' intended purpose and their importance:

The Log-In functions:
0.1 User's Name
0.2 Log-In Identification
0.3 Password or Pass-phrase The 3-step long-in requirement affords an added level of security for a user. Normally the User's name is used as the Log-In identification, but this need not be so.

The Send Messages functions:
1.1 Address Lookup
1.2 File Attachment
1.3 Spell Check Message Body
1.4 Compression Attachment(s)
1.5 Encrypt Message
1.6 Digitally Sign Message The user needs to have the ability to send messages. Sending messages involves composing a message, selecting an address to which the message is to be sent, attaching media files, encrypting/signing the outgoing message, and, if applicable, compressing any of the attachments to the message. The composition feature is inherent to all e-mail applications. The application provides message composition with all of these features.

The ability to compress outgoing message attachments from within the e-mail application is a unique feature of the application in that the compression is handled entirely by the application and relies on no external application.

The Receive Messages functions:
2.1 Add Address to Address Book
2.2 Save Attachment(s)
2.3 Decompress Attachment(s)
2.4 Verify Digitally Signed Messages
2.5 Decrypt Messages
2.6. Virus Warning for Message Attachments When receiving messages, the application displays the information important in describing the message(s), the content of the message(s), and the size of the message(s). This information is referred to as the header information of the message(s). At first, only the header information is retrieved from the mail server and displayed to the user. When the user selects a message to be read, then the complete message is downloaded and displayed to the user. Furthermore, attachment listings are provided prior to download. Some incoming messages may be encrypted, digitally signed, and/or compressed. The application automatically performs decryption, digital signature verification, and/or decompression as necessary.

The application's ability to automatically handle compressed files is a unique feature. The application also decompresses incoming attachments that have been compressed with, for instance, the gzip algorithm.

The View Message Book functions:
3.1 Add New Folder
3.2 Delete Existing Folder
3.3 Compose Reply Message
3.4 Manipulate Message Status
3.5 Order Messages in Particular Folder
3.6 Archive Folder(s)

3.7 Delete Message(s)

3.8 Save Originator information

The application provides a rich set of tools that the user can employ to organize messages. The message folders are displayed to the user in a three-folder format. The three main folders are the inbox, the sent folder, and the draft folder. The inbox contains all messages received by the user, the sent folder keeps a copy of all messages that the user has sent, and the draft folder contains those messages whose composition has been commenced but not yet completed. In addition to these primary folders, the user can add new folders as sub-folders. Any created message folders can be deleted and easily moved to a new location. This provides for organizational flexibility such that the user can create a customized message folder hierarchy.

The Modify Account Book functions:

4.1 Add E-mail Account 4.2 Delete E-mail Account 4.3 Set Default E-mail Account(s)

4.4 Get Messages from E-mail Account 4.5 Create Account Folder 4.6 Delete Account Folder The user is given the opportunity to check all existing e-mail accounts through one server—the application's mail server. The method in which it is presented to the user is unique. The user's accounts are organized in an account book. This account book holds, in addition to account information, information that instructs the application if the user would like the accounts to be automatically checked, or manually checked. Thus, the user has complete control over what e-mail accounts are checked and when they are checked. The account book better organizes the various accounts a user may have by providing the ability to group accounts into folders, and to provide the user with a clean interface with which to access other accounts.

The Modify Appearance functions:

5.1 Alter Background Picture 5.2 Import Background Picture

Many users have different tastes in music, entertainment, food, and many other activities. Users of the Internet, and thus e-mail, comprise the most diverse of all communities. The application provides the user with the ability to set visual preferences when using the application. Several backgrounds are available as well as poster cards, note cards, and other graphical designs. Furthermore, the user can import an image that he/she wishes to use. The application is completely customizable, giving users the feeling that they "own" the application.

The Modify Signature File functions:

6.1 Enable Signature File 6.2 Disable Signature File 6.3 Create Signature File 6.4 Modify Existing Signature File Signature files are text files that are appended to the end of every message a user sends. These files are useful to users who wish to send a quote, place contact information, or include other information on every outgoing message. Signature files do not need to be used, thus the application provides the ability to choose between using or not using a signature file.

The Modify Address Book functions:

7.1 Add New Folder 7.2 Compose to Highlighted Address/Folder 7.3 Add Address(es)

7.4 Item Placement 7.5 Delete Folder 7.6 Delete Address

The address book is an important feature of any e-mail application. The application presents the user with a clean, easy-to-use interface for creating, storing, and manipulating e-mail addresses. Each address is treated as a business card, or data sheet, and contains the addressee's name, e-mail address, telephone number, fax number, house or business address, and notes about the addressee. Each of these address card fields are provided by the user, or taken from a received message, i.e. an e-mail address. In addition to providing individual address organization, the application provides the ability to create folders to hold addresses. The folders can be used in such a way that they group those addresses with something in common. For example, a particular user may have several friends, business associates, and family members with whom they correspond via e-mail. An address folder can be created for each category of correspondent—a folder for friends, a folder for business associates, and a folder for family members can be created.

The Modify Filters functions:

8.1 Create New Filter 8.2 Delete Existing Filter 8.3 Modify Existing Filter 8.4 Create Inbox Folder An advanced feature of many e-mail applications local to the user's machine is the ability to filter incoming messages. The user can create a filter that applies a rule to incoming messages. Messages that pass the tests set up by these rules are then placed into the designated folder contained in the Inbox. The ability to create message filters requires the ability to create folders in the Inbox directly from the filter setup (in case the folder hasn't already been created).

The Vacation Reply functions:

9.1 Enable Reply 9.2 Modify Reply Message 9.3 Disable Reply

"Vacation reply" is a feature that can be activated or deactivated as the user desires. A user can use the vacation reply program on the mail server to respond to incoming messages while the user is away. If the user is on vacation, or out of town for a few days, the user can enable the vacation reply program from the application, tell the program what the reply is to be, and then turn it off when they return. As an advanced feature, EMC's reply program understands the concept of time, and can be preset to disable itself. Reply messages sent by the vacation reply program cannot be signed or encrypted.

The Web-based and client-side implementations of the application are inherently different. One runs on the Web, and the other on the user's local machine. The differences between the states of operation arise primarily from the fact that the Web-based application has a different operating environment than the downloaded application. The downloaded, client-side application simply downloads to the user's machine once, and is then run when the user wants to generate or read his/her e-mail. The user connects to the Internet when he/she wants to check for or read his/her mail at the server. This implementation can contain and process all necessary information completely on the local machine. On the other hand, the Web-based application cannot behave this way because of bandwidth constraints and for other reasons.

Figure 5:
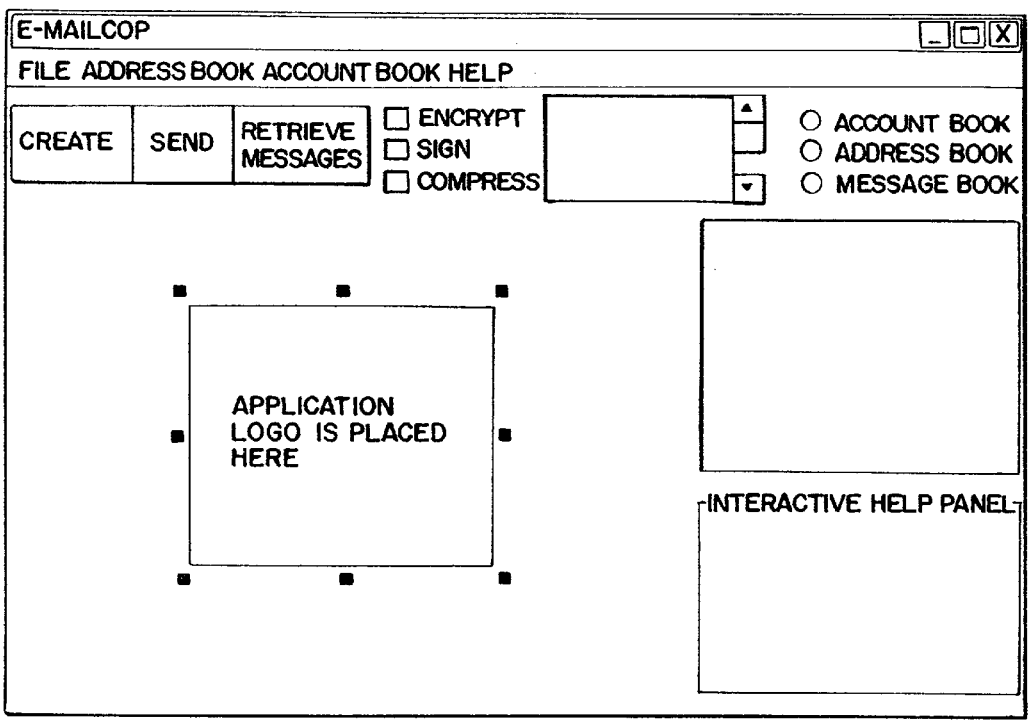
FIGS. 5 through 14 are screen shots of the various screens used in a preferred embodiment, implementing the invention.

This implementation of the application (known as "client-side") is run within a single frame (see FIG. 5). That is, when the user launches the application, a single window appears, and nearly all operations performed by the application take place within this window. The window contains a title bar, menu bar, selection buttons, three radio buttons, three checkboxes, three subwindows, and an Interactive Help Panel. The organization of the title and menu bars is familiar to users, in that the elements are located at the top of the window and span the width of the window.

The selection buttons are "Create," "Send," and "Retrieve Messages" (FIG. 5). The Create button permits the user to compose an outgoing message. The Send button permits the user to send a message that has just been composed, and the Retrieve Messages button instructs the application to check for new messages on the mail server(s). The three subwindows consist of a folder window, a larger, primary window, and a medium-sized, viewer window. The folder window is small and displays the various message folders that the user has available. The larger window is a dynamic window that may contain the composition of a message, a dialog with the user, or other functions. The medium-sized window is for displaying message headers, account information (if in the e-mail account book), and address information from the address book (if in the address book).

The three checkboxes provide the application with knowledge of the user's cryptography/compression preferences for the current composition. The three radio buttons are used to toggle among the address book, the account book, and the message book.

The Interactive Help Panel at the lower right of the image is used to help guide the user through the use of the application. The goal of the Interactive Help Panel is to give the user information pertaining to the current state of the application without being "in the way" with extra windows and/or unnecessary dialog boxes. The Interactive Help Panel is described in detail below.

The user interface is graphical and is organized as shown in FIG. 5 and later figures. This interface was created using Visual Basic, although other languages can be used. The sub-windows are referred to, beginning with the top-most window and moving clockwise, as one, two, and three. Thus, the third window is the largest window (where "Application Logo placed here" is shown), the second window is the one just above the Interactive Help Panel, and the first window has a vertical scroll bar.

The menu bar contains four menus: File, Address Book, Account Book, and Help. Each menu is explored below in some detail.

The Interactive Help Panel ("IHP") is displayed in the lower right hand corner of the application window. The purpose of the IHP is to give the user useful tips, hints, and suggestions when using the application. This panel is also used for user prompting, especially when the user is about to perform a "destructive" act, such as modifying a message filter, or deleting an address sheet. Each display of the IHP also includes a toggle switch that, when selected, will disable that particular suggestion. Entering the preferences option from the file menu on the menu bar resets the IHP.

The File menu (FIG. 5, top line) contains nine sub-menus: exit, get messages, create, preferences, compress/decompress folder, display, filters, certificate book, and print. This menu option provides some miscellaneous functions of the applications that don't fit in the other menu options.

If exit is chosen from the File menu, the application determines what state it is currently in. If the application is in the compose state, the user is prompted to save the current draft to the Draft List from the Interactive Help Panel. If the application is currently viewing a message, then the application simply shuts down. If the application is in a running state, that is if it is currently performing some operation such as encryption of an outgoing message, the ability to exit is not available. This prevents the user from exiting during the execution of a critical process.

The "get messages" option initiates the process of checking for and receiving any new messages that are on the mail server(s). If the application is currently performing another process, this option is not available to the user.

The "create" option initiates the applications composer. The composer is fully described below. This option is unavailable when the application is performing another operation.

Figure 6:
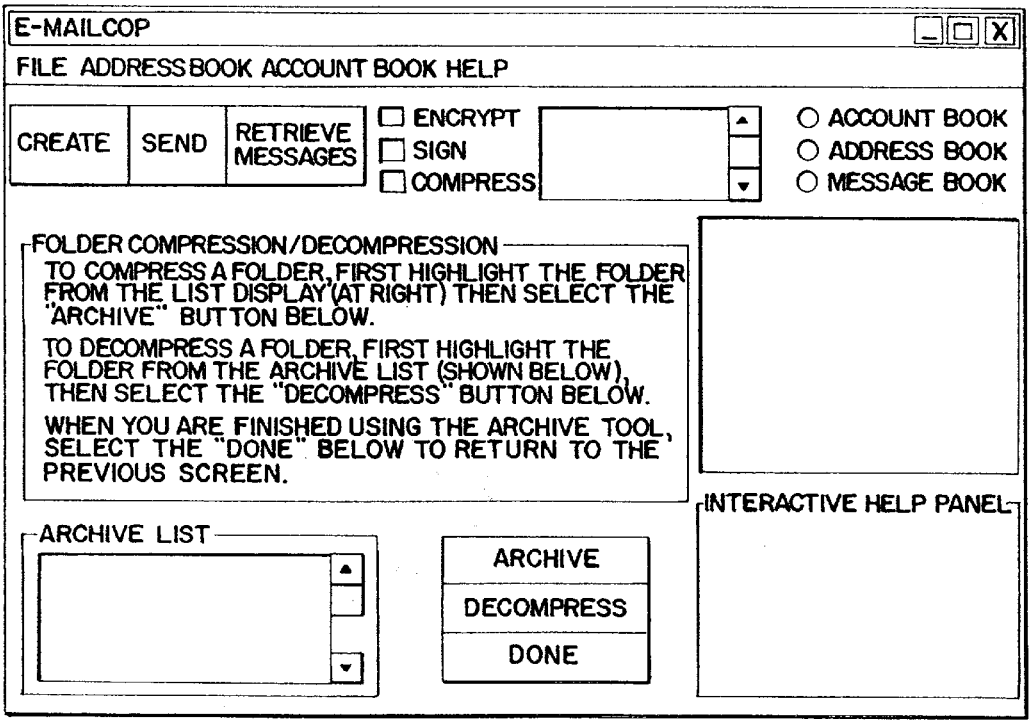

The Compress | Decompress Folder option from the File menu places a dialog box in window three of the application, as in FIG. 6. The dialog shows the status of the user's Message Book in a hierarchical fashion. The user can select (highlight) a folder and then compress that folder. When the message is compressed, it is saved in an alphanumeric fashion. As an example, if the Sent List were to be selected, the saved (compressed) file would be "sent1.cmp". The folder would then be replaced with a new one. The new folder assumes the same name as the folder that was compressed. The dialog appears as shown in the image of FIG. 6. The user can delete as many folders as is desired or none at all.

From this dialog, the user may also decompress previously compressed folders. A list of previously compressed folders is shown in the text box labeled "Archive List" in the lower left-hand corner of the screen. To decompress a folder, the user first highlights the archived folder from the Archive List text box and then selects the "Decompress" button. When a file containing a folder is decompressed, the entire folder is placed within the current folder that replaced it when it was compressed. If that folder has been deleted or is otherwise not in existence, the application places the decompressed folder as a subfolder of the inbox.

As an example, when the Draft List is archived and labeled as the file "draft1.cmp", where the "cmp" extension represents a compression file, the application creates a new Draft List to replace the old one. When draft1.cmp is decompressed, a new folder is created in the Draft List named "Draft List 1", and the messages/folder listings that were contained in the compressed file is placed in this new folder. This option is not available if the application is currently running a process. To quit this operation, the user selects the "Done" button, which returns the application to the previous state of operation.

Figure 7:
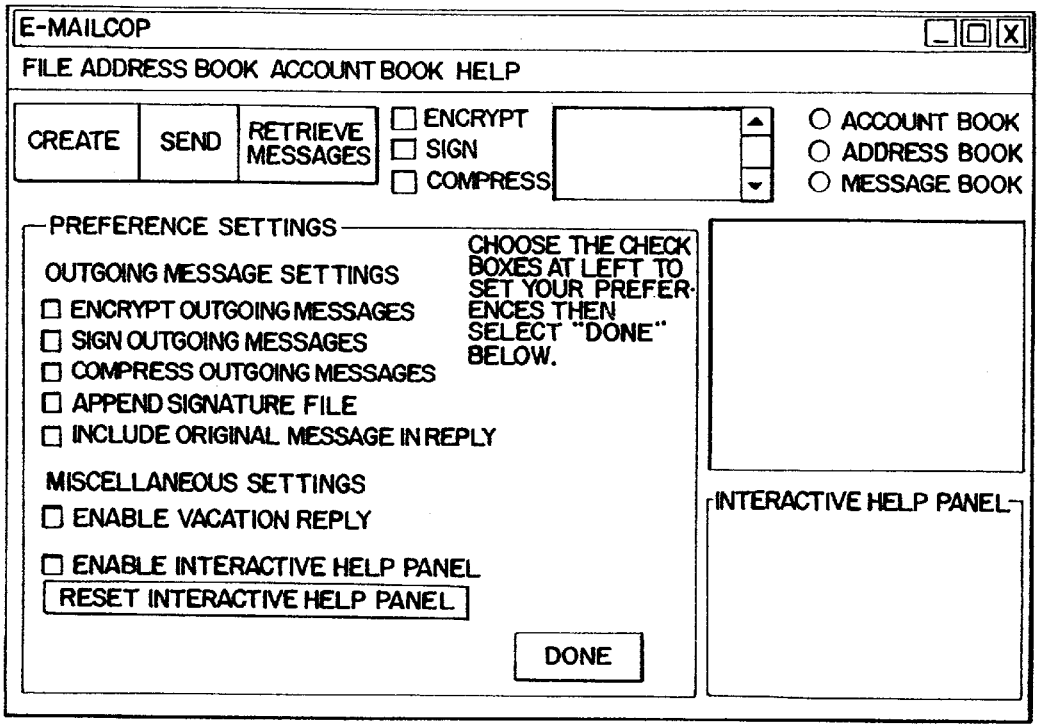

The Preferences selection places a new display in the third window of the application (see FIG. 7). The preferences dialog allows the user to set certain defaults and to reinstate the Interactive Help Panel (if any of the options were previously disabled). Default preferences are set upon installation of the application. If the user has obtained a digital certificate, then the "encrypt" and "sign" options are set in addition to the other pre-set options. These pre-set options are outgoing compression and the Interactive Help Panel.

The user can select the options that he/she prefers. If a user doesn't wish to use the Interactive Help Panel, that option can be disabled by checking the checkbox "Interactive Help Panel Settings" heading. In order to restore the Interactive Help Panel to the default functionality, the user would click the "Reset Interactive Help Panel" button. The user also has the availability to enable/disable encryption, digital signatures, attachment compression, signature file appending, and outgoing message options. When the user is finished selecting and/or deselecting the available options, he/she may exit the preferences display by selecting the "Exit Preferences" button. When this button is pressed, the application moves to the prior state of the application. That is, if the user was in a different state, such as composition, that state would return to the display, assuming the exact information that was there when the user entered the preferences state. It is important to note that the selection of certain options from the preferences display does not affect the previous state of the application. Thus, if the user was composing a message before entering the preferences state, and then changed the encryption settings, these changes would be noticed, not on the current composition, but on the next composition.

Figure 8:
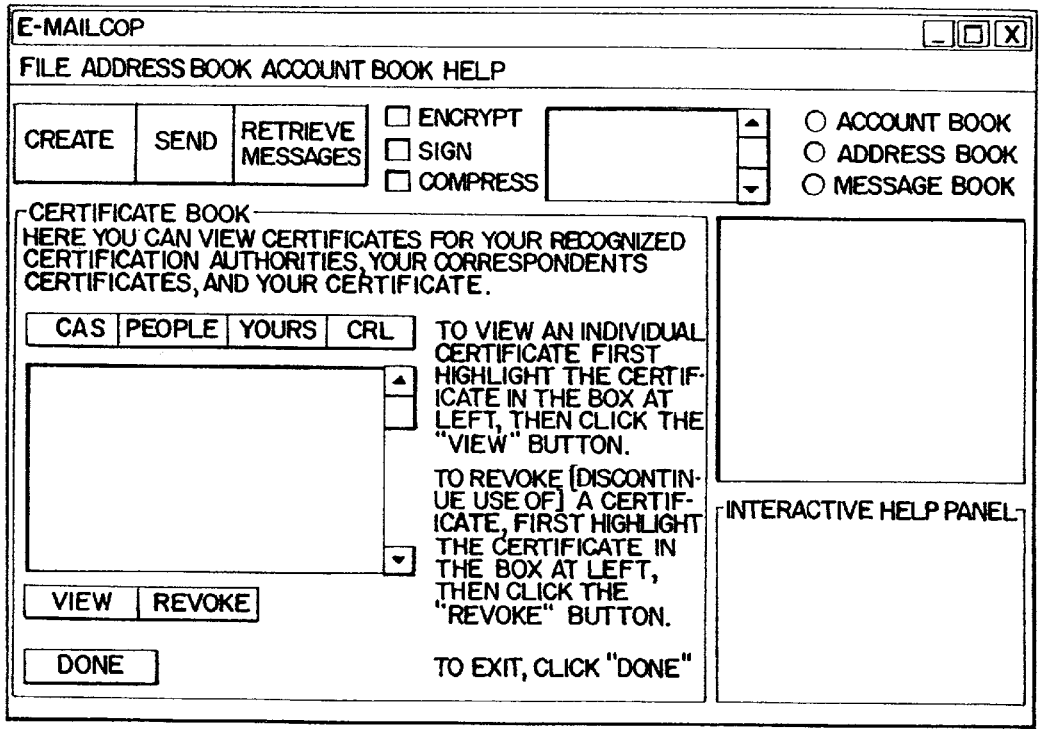

The View Certificates component allows the user to view and control the various certificates that are stored in the certificate book (FIG. 8). The user can view certificate information, revoke certificates, and determine those certificate authorities that they trust.

The dialog, as displayed in the third window of the application, contains a text box, instructions, and seven buttons. The four buttons lined along the top of the text box display certificate listings for various entities: Certificate Authorities (CAs), other people, the user's certificate, and the Certificate Revocation List (CRL). When one of these buttons is selected, the text box of the dialog displays the appropriate certificates to the user as a list. To view a certificate, the user highlights that certificate within the text box and then clicks the "View" button. Then the certificate information replaces the certificate list. The user also is able to revoke certificates by first highlighting the certificate from a list presented in the text box, then clicking the "Revoke" button. When the user is finished with the certificate book, he/she clicks "Done" to return to the previous state. That is, if the user was composing a message when they entered the certificate book, then that composition reappears when the user exits the certificate book.

The Display option gives the user the ability to change the appearance of the application in general. Options include any images that are available on the application, as well as windowing properties (i.e. frame color, etc.).

Figure 9:
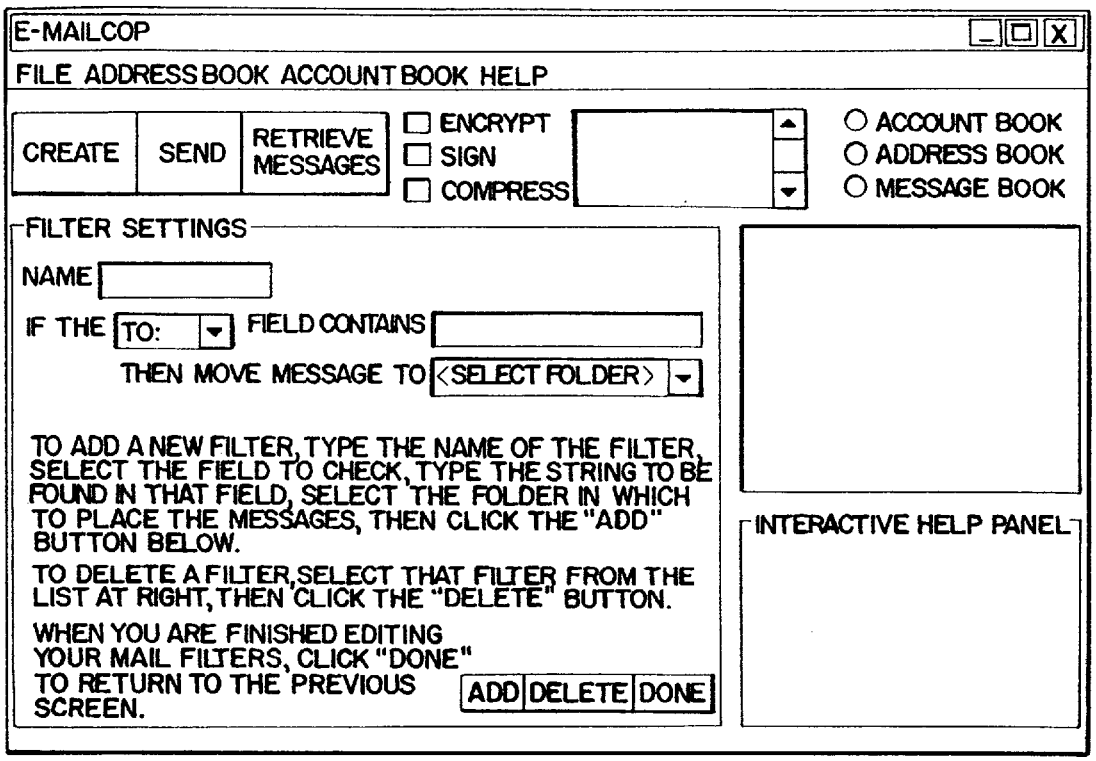

Selection of the "Filters" option from the file menu displays a filter dialog in the third window of the application (FIG. 9). This dialog allows the user to create, modify, and/or delete existing e-mail filters.

The user adds a message filter by entering a filter name, the constraint field of the filter, what the field should contain in order to be filtered, and a folder in which to place the messages meeting the requirements of the filter. The constraint fields are those fields found in the header of an e-mail message, such as "to", "from", and "cc". The user can select any number of containments for the field, the most common being either part or all of an e-mail address. The pull down menu lists the current folders in the Message Book, and contains a selection that allows the user to create a new folder from within this display. This display cannot be entered if the application is currently running a critical function.

The address book menu (in the top line of the tool bar) contains one sub-menu: modify. The address book is displayed (FIG. 10) in terms of Address Sheets and Address Lists in the second window of the application, and the dialog for manipulating the address book is shown in the third window of the application.

Figure 10:
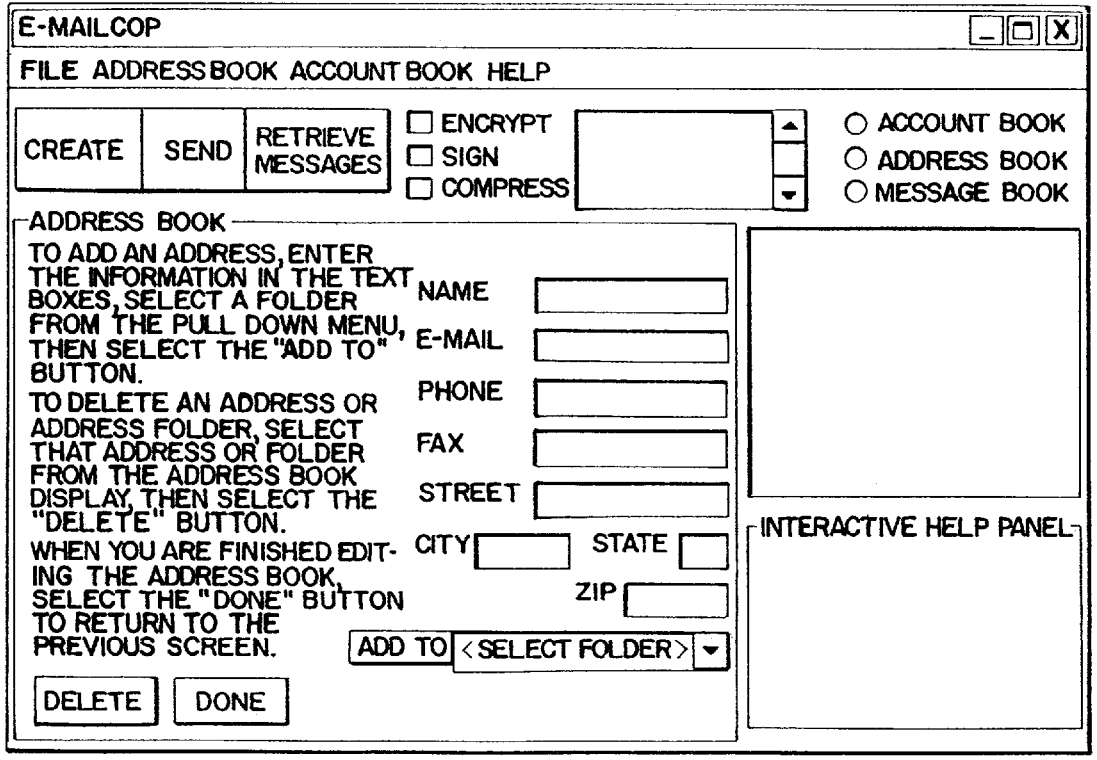

The Modify option is not available to the user if the application is currently running a process. Selecting the Modify option brings up a dialog box that guides the user through the process of adding, modifying, and/or deleting an address to the address list, which is displayed to the right in the second window of the application (FIG. 10). As the image indicates, the user is able to both add and modify address sheets for correspondents directly from this dialog box as well as add and/or delete address folders. If the user wishes to add an address to the Address Book, he/she enters the relevant information in the text boxes labeled, Name, E-mail, Phone, Fax, Address Fields, and Notes. Then the user selects the address folder in which to place the new address from the pull down list located in the lower center area of the GUI. To complete adding the new address, the user simply clicks the "Add to:" button.

If the user would want to modify an existing address, he/she first highlights the address name shown in the second window of the application (far right). When he/she highlights the address listing, the user then sees the full information for that address appear in the text boxes of the dialog box. The user can then make the appropriate changes to the information, and then click the "Add to:" button to replace the old address with the new one. A prompt is placed in the Interactive Help Panel before the old address is actually replaced, to confirm the user's desire to perform that action. When the user is finished modifying the address book, he/she can exit the dialog by selecting "Done". When this button is selected, the application moves back to its previous state. Thus, if the user was composing a message, then the composer is displayed with the previous information contained in that display maintained.

The pull down list that displays the current folders has an option that allows the user to type a new folder directly into that box. Then, when the user presses the "Add to:" button, this folder is created, and then the new address is placed into that folder. This method of adding a folder to the address book can also be used to create a folder containing no new address. When the user wants to add only an address folder, then he/she leaves all of the text boxes blank, types the name of the new folder in the pull-down menu, and then clicks the "Add To:" button.

Furthermore, if the user wants to delete an address from the Address Book, he/she first highlights the address in the second window of the application, and then clicks on the "Delete Selection" button below the "Notes:" text box. The application then prompts the user via the Interactive Help Panel to ensure that the user would like to carry out this action.

The Account Book selection (in the top line of the tool bar) also contains just one submenu: modify. The e-mail account book is displayed in terms of Account Sheets and Account Lists in the second window of the application.

Figure 11:
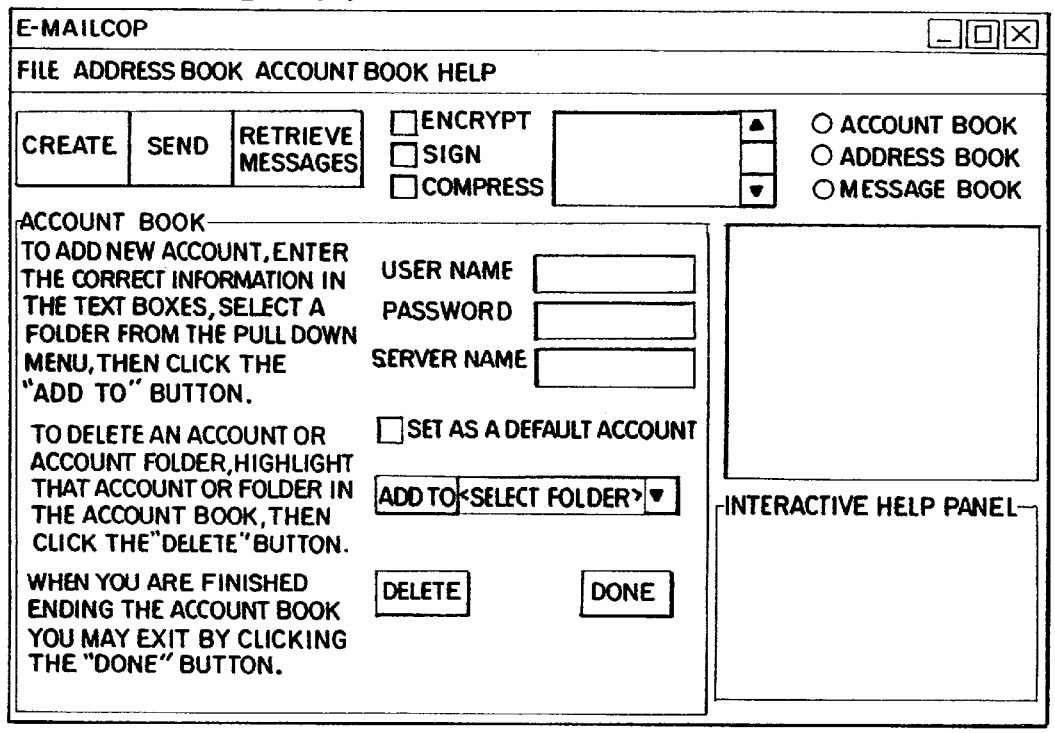

When the Modify option is selected, the application displays the dialog box of FIG. 11. If the application is currently running a critical process, then this option is not available to the user until that process is complete. This dialog box guides the user through the process of adding/ deleting/modifying an existing e-mail account, and/or adding/deleting a folder to the account book.

When the user wants to add a new e-mail account to his or her account book, then the user first enters the appropriate information in the supplied text boxes labeled: User name, Password, and Server. The user name field holds the user's name on that account, the password field holds the password the user must supply to access the account, and the server field holds the name of the server on which the account resides. The password field is "blind," that is, rather than printing what the user types, the only characters that show up are asterisks (*). When the user wants to modify an account (as when the user has modified the password), then the user is required to highlight the account in the account list displayed at left. When this is done, the account information is placed into the appropriate text boxes. When the user wants to delete an account or folder, the user first highlights the account, then clicks on the delete button.

When the user would like to create a new folder, he/she uses the pull down menu to type a new folder name. The user needn't supply account information to create a new folder, although this option is available in the event the user would like to place a new account in a new folder. In this, and every case listed above, the user is prompted by the Interactive Help Panel at the lower right of the application to confirm the addition/deletion operation.

When the user is finished manipulating the Account Book, then the user must select the "Done" button to exit the display and return to the previous state of operation. Thus, if the user was composing a message, the composer is displayed having maintained all of the information the user may have entered into that display.

The Help menu (top line of the tool bar) contains an online help reference, a brief tutorial, and an "about" section that lists that application's version, completion date, etc. If the application is currently executing a critical process, then these options are not available until the process is complete.

Figure 12:
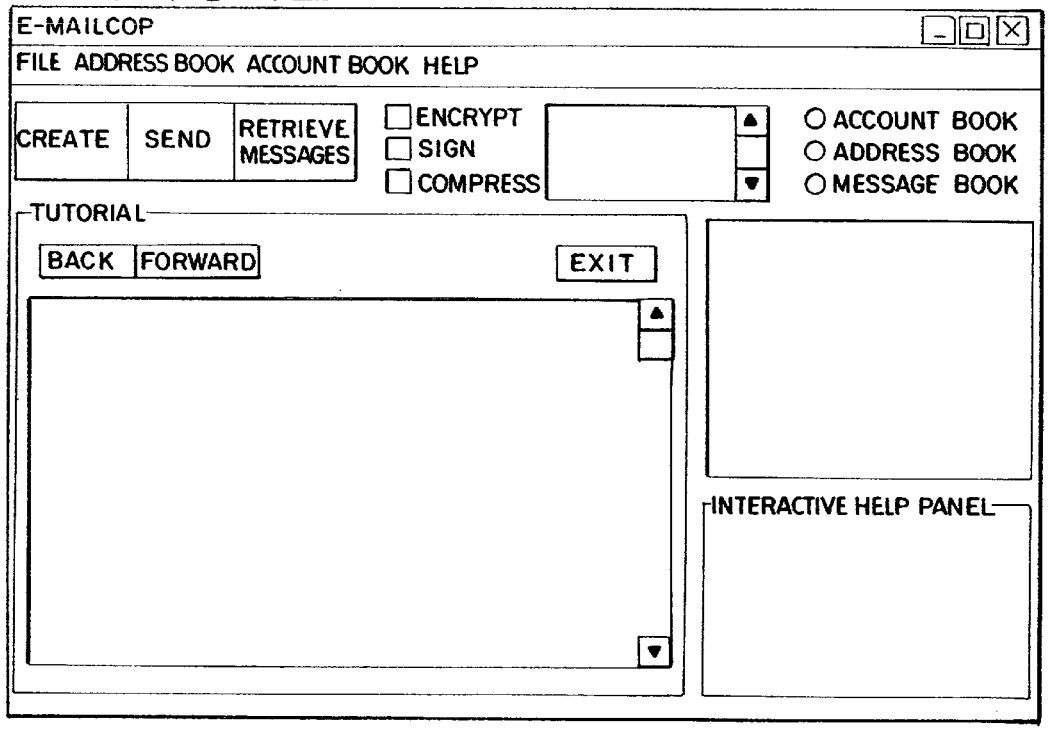

The Tutorial option brings up a dialog box as in the preceding examples, but provides one large text box with a chapter listing, back and forward buttons, and an exit button. The layout of the dialog is similar to the one displayed in FIG. 12, and the text of the tutorial is shown in the large text box. The user is able to view the different chapters of the tutorial, or view an index (this option is included in the chapter pull down menu). When in each chapter, the user is able to utilize the back and forward buttons to move either forward or back a page. If the user selects the exit button, then the application closes the tutorial and automatically returns to the start state.

When the Online Help option is selected, an online index appears in the third window of the application. At the user's disposal is an index of common words/features/lists/terms or other useful "guiding" words that the user may want to search for. When the user highlights one of these options in the index, the help listings from the tutorial are displayed below so the user can select one of the options.

The About selection displays information regarding the current version of the application. The information is displayed in the Interactive Help Panel so that no other option or operation is disrupted. Included in the About display is the version number of the application, the date of its release, and contact information (including Web information). This option is not available when the application is running a critical process.

Figure 13:
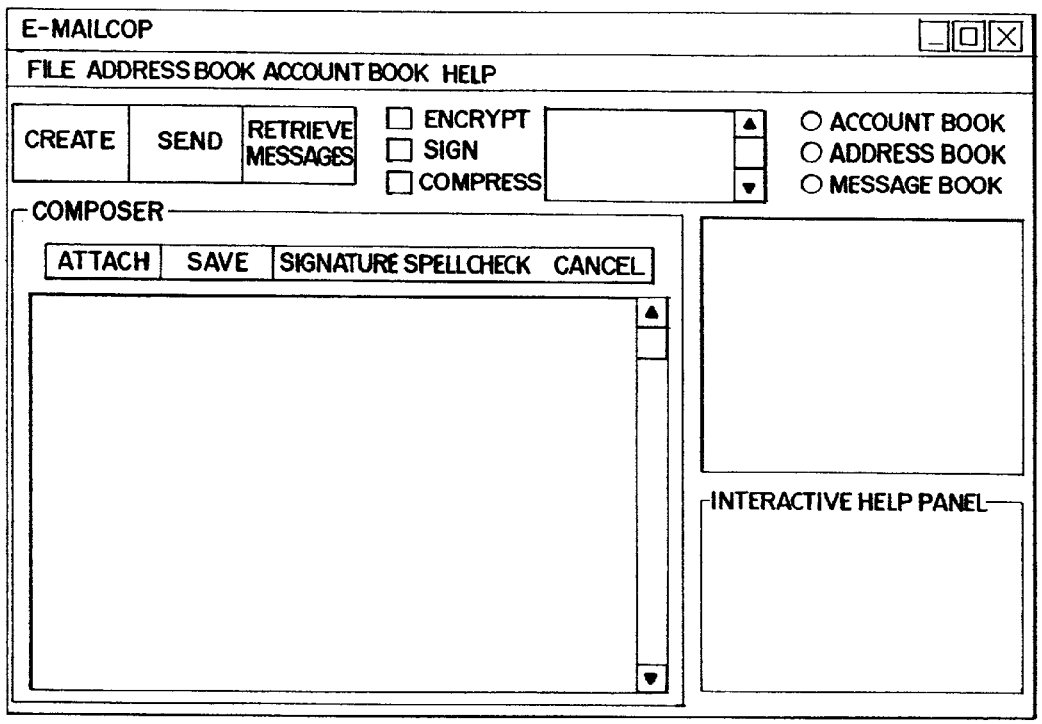

The Create button (second line of the tool bar) brings up the composition screen (FIG. 13). This screen is placed into the third window of the application. The preferences are read such that the application understands the user's desire to encrypt, sign, and/or compress the outgoing message or its attachment, if any. This button does not operate if the application is currently running a critical process. This screen is where the user composes outgoing messages. When the user is satisfied with the composition and is finished editing the composition, the user presses the "Send" button (described below) to complete the action. Five additional buttons are shown: Attach File, Save as Draft, Signature File, Spell Check, and Cancel.

The Attach File button, when clicked (on the tool bar in the frame), brings up a dialog box (the only separate window used by the application) in order to allow the user to select a file that he/she wishes to attach. The file can be of any type and size, if the user has the proper permissions to access and download the file. The dialog box that this option displays is a familiar Windows file dialog box. It supplies a directory tree, a name field, a pull down menu of available disk drives, etc. When a file is attached, it is placed into a buffer and waits for the send or "Save as Draft" button to be selected for proper handling. When the user has completed selection of the desired attachment, the file dialog exits and the user may continue editing the composition. This option is not operational if the application is currently running a critical process.

If the user selects the "Save as Draft" button, then the application acts as though it is sending the message, but rather than sending the message over the Internet to the desired address, the message is placed in the Draft folder of the Message Book. Thus, the message and any attachment(s) are properly formatted for sending, including any encryption, signature, and/or compression requirements. When the application is finished with this operation, the start state of the application is displayed.

Figure 14:
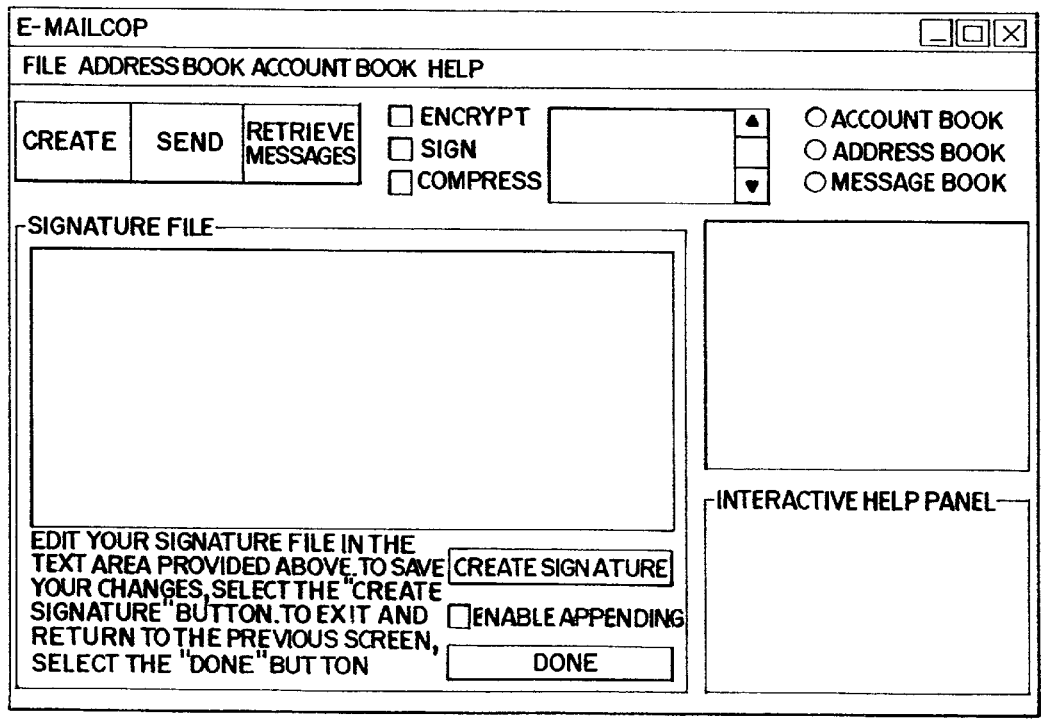

A user, by selecting the Signature File button, from the top line of the Composer frame tool bar, can create and/or manipulate a signature file as well as enable or disable the option to append a signature file to outgoing messages (see FIG. 14). This option requires that a new dialog box be shown to the user. As such, the old dialog box (FIG. 13) is hidden rather than closed, so that the user does not lose any information already placed in the composition of the message. This option is not available when the application is currently running a critical process. This display is a simple one that provides the user with some instruction. If a signature file has been created, then the application displays that file in the text box (contained in the third window of the application). If the user has not yet created a signature file, then the user can create one by entering the desired signature in the text box, then clicking on Create Signature. This action makes the file available to the application by saving the file to disk.

If the user has already created a signature file, but wishes to modify that signature file, then the user first makes modifications, then selects the Modify Signature button to save those changes. When the user would want to enable or disable the signature file, then he/she marks the checkbox. If the box is marked, the file is enabled. If the user would like to exit with or without making changes to the signature file and its operation, then the user simply clicks on the Return button to go back to the Create display.

The Cancel option provides the user a way to exit a composition. When this option is selected, the display returns to the application's start state, and all information regarding the current composition is lost. This option is not available to the user if the application is currently running a critical process.

When the user selects the "Retrieve Messages" button from the second line of the tool bar (FIGS. 5–14, second line of tool bar), the application gets messages from the user's various e-mail accounts. The first account to be checked is the account found on the EMC server. If the user has other accounts listed in his or her e-mail account book, these will be checked in the order in which the user entered them. Note that only default accounts will be checked automatically. Any other accounts must be checked for messages manually. For each account that is checked, the message filter will be invoked. The state of the application remains the same except for the second window, which changes to display the message book.

The Encrypt | Sign | Compress check-box options (FIGS. 5–14, second line of tool bar) allow the user to select, for each composition, the appropriate action for the application to take when sending a composed message. When the application is run, the preferences of the user are read and these options would be run accordingly. The availability of the options at the time of composition provides the user with the ability to change his or her mind for each message. If an option is marked, then it is enabled. Thus, if the Encrypt option is checked, the next outgoing message is encrypted. If the user changes any of these options for a given message, then the application changes the options to such preferences after the current composition is sent, saved as a draft, or canceled.

The Address Book | Account Book | Message Book radio buttons (FIGS. 5–14, second line of tool bar) allow the user to toggle between the Account, Address, and Message Books. Only one option can be displayed at any one time. These are shown in the second window of the application in a hierarchical fashion. If the user would want to return to the Message Book, he/she highlights a folder in the first window of the application. These options are not available if the application is currently running a critical process.

The user can bring up the Address Book or Account Book dialog when he/she double clicks on a particular address or account or folder. If the user would like to send an e-mail message directly from the address book, the user first highlights that address (or address folder for a "bulk" mailing), then selects the "Create" button contained in the main window of the application. If the application is currently in another state, such as the composition state, then that display is simply hidden from view rather than destroyed. Similarly, the user is able to view any message from the Message Book by double clicking on that message in the message book. This displays the Message Book Display as previously described.

The Web-based application cannot be contained in a single unit, per se, as the client-side application is. Rather, the application spans from the client to the server. Known Web-based e-mail providers have not had, or even attempted to implement, security measures such as the X.509 certificate standard. In the case of the Web-based application of the present invention, the application runs as a distributed system. That is, the application controls are sent to the user to be viewed on the user's browser, and through these controls the user operates the application that resides on the server.

The functioning of the Web-based application takes place primarily on the server side of the application, and the controls are passed through a secure channel using the Secure Sockets Layer protocol ("SSL"), or some other security protocol offering a secure "pipe" to and from the application level. Thus, all certificate information and initial message information is secured on the user's account as it exists on the mail server. This approach provides a fully accessible, secure e-mail application that the user can utilize from any web-enabled computer anywhere in the world, within legal boundaries.

Some components of the application must be ported to the user's machine at each mail session, such as the compression tools. The porting of this component minimizes the bandwidth usage of the user from the local machine. Depending upon size, some other components may be downloaded to the browser on a per-session basis. Often, users of Web-based e-mail wish to place attachments on their outgoing mail and/or download messages that they have received for printing or some other purpose. The Web-based application running in the browser provides a way for the user to access and download messages to his or her local machine, as well as upload attachments for sending. The user also has the capability to download messages to the local machine and store them in a provided message book.

Figure 1:
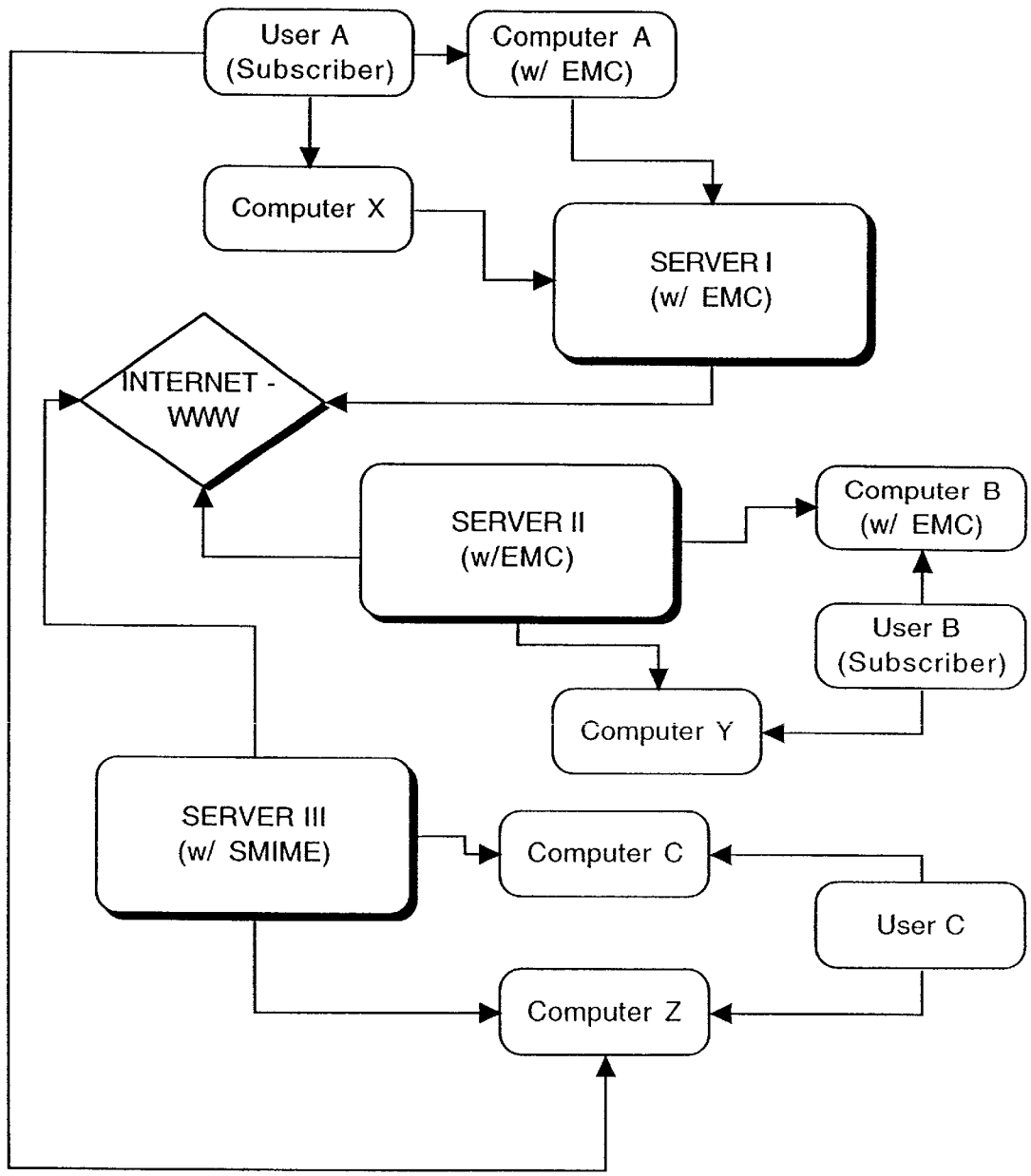
FIG. 1 is a general operating diagram of the method of the present invention, depicting operation of the electronic messaging system in different circumstances for various subscribers and users.

In use and operation, a premium-service subscriber to the EMC service, User A in FIG. 1, has a choice of accessing his e-mail through either his personal computer A or through another computer X, as shown. Computer A has the EMC program loaded onto it, and computer X does not. User A can use computer A to compose a message, to add any attachments, to set the encryption of the message and the encryption and compression or not of any attachments, etc., and to sign the message digitally or not, all while off-line. To send the message and any others, and to check and receive any messages sent to him by others, he/she connects over a telephone or cable line, or any other hard-wired or wireless connection, to his ISP's Server I. That server is licensed by the present inventors and also has the EMC system installed. Server I confirms the identity and digital signature of the subscriber and accepts the message uploaded from Computer A along with any attachments. User A can use computer A from home or the office or on any other Internet connection, as when he/she is travelling with a laptop or notebook computer A.

If User A is away from home or office and cannot use his Computer A, he/she still can send and receive e-mail with all the information and options of his home Computer A. He/she need only log onto Server I from any computer with suitable hardware and software, as Computers X or Z as shown. Computer X connects to his own Server I, while Computer Z connects to a Server III, as shown, which does not have EMC loaded or licensed, but does practice the S/MIME protocol. In either case User A logs into Server I using his user and/or identification name(s) and password; if he/she is on Server III he/she merely needs to access Server I through the Internet. He/she is able to compose mail on-line, and receive mail, with all the same encryption, authentication, etc. features, settings, and organization as he/she had on his own Computer A.

A message sent by User A to another EMC subscriber, as User B, is routed from the Computer A or Computer X through Server I and over the Internet (and possibly over or through other servers there) to a Server II of User B. It is stored there, in the EMC Web system application, with any attachments and in any encrypted form used by User A, until User B logs on to retrieve that message. If User B uses his/her regular Computer B with EMC loaded, he/she may download the message, have it automatically decrypted, and any attachments decompressed, if necessary, for reading off-line. If User B uses a different computer, as Computer Y, through Server II, he/she must remain on-line to read the message, although it will be decrypted and any attachments decompressed for her by Server II as part of the EMC program and service.

A message sent by User A to a non-EMC subscriber, as User C, is routed from Computer A or Computer X through Server I and over the Internet (and possibly over or through other servers there) to a Server III of User C. It is stored there, in the Web-based e-mail application of User C (as Hotmail®), with any attachments and in any encrypted form used by User A, until User C logs on to retrieve that message. Whether User C uses his regular Computer C or another Computer Z, neither one having EMC loaded, he/she may download the message and have it automatically decrypted under the S/MIME protocol. However, for any attachments that are compressed, User C must go to a different program to decompress and read them. If User C has a client-side e-mail system (as Eudora®), he/she would download the message and attachments and can then read and otherwise manipulate them off-line.

If User A wants to send a message to a user not on a secure server or computer, i.e., not using S/MIME or similar protocol, he/she may do so, but the message and attachments will not be encrypted (User A will be warned of this by the EMC system). Interoperability is an important feature of this invention, so that subscribers can communicate electronically to all other persons, not just to those on a particular system.

To receive e-mail messages from others, User A opens his client-side program on Computer A, or logs into Server I from any other Computer X or Z connected to any Server. He/she downloads the messages to his Computer A, or reads them on-line on the other Computer X or Z. The messages are decrypted automatically, attachments are decompressed automatically if necessary, and other features of the EMC program are implemented for him, since he/she is tied into Server I, which runs the web-side EMC system.

Many variations may be made in the invention as shown and its manner of use without departing from the principles of the invention as pictured and described herein and claimed as our invention. "Personal computer" as used herein refers to computers of all manufacturers and operating systems, whether PC, Apple, Unix, Java, Wintel, etc. Minor variations will not avoid the use of the invention.

We claim as our invention:

1. A method of providing a secure electronic messaging service to each of a plurality of subscribers, using a server and a personal computer both connected to a global computer network, the method comprising the steps:

programming each of a server application and a personal computer application with a secure e-mail messaging service configured to interact with and to shadow the other application via said network as to personal information, settings, and files of an individual one of said subscribers;

storing said information, settings, and files both on said server and on said personal computer running said application, for access off-line solely through the personal computer of said subscriber and for access on-line by said subscriber through any computer having capability to communicate with said server;

allowing access to said messaging service via said server for a subscriber's sending and receiving electronic messages; and providing a digital certificate security service from each of the server and the computer together with the messaging service.

2. The method of claim 1, wherein the step of accessing the server of the messaging service from a personal computer using the Web-based form of service further comprises the step of using an S/MIME compliant application to connect between the computer and said server.

3. The method of claim 1, wherein the step of providing a digital signature security service includes verifying the identity of the sender, the integrity of the message, and the fact of the sending by the sender.

4. The method of claim 1, further including the step of decompressing automatically a compressed attachment to a message upon its reaching and being opened by a subscriber.

5. A method of providing secure e-mail service to a subscriber, the service being accessible equally from an e-mail program on a computer of the subscriber and via the Internet (a global computer network) from other computers which may be used by the subscriber, the method comprising the steps:

loading the e-mail program onto the subscriber's computer, the program being one for composing and displaying e-mail messages thereon while the computer is off-line, using personal information, settings, and files of the subscriber and for providing at least one of address, e-mail account, and message book features;

providing an e-mail service on an Internet server accessible by said subscriber, the service and the program on the subscriber's computer each shadowing the content of the other for said personal information, settings, and files of the subscriber and for each of the address, account, and message books of the subscriber;

allowing access to the e-mail service on said subscriber's computer and from any other computer via a modem or the Internet;

synchronizing and updating the personal information, settings, and files of the subscriber and the features and content in the subscriber's program and in the e-mail service on the Internet server upon each access of the subscriber's computer to the Internet server and e-mail service after a change in either, and providing from each of the e-mail server and the user's computer, with one or more messages a digital signature security service for verifying the identity of the sender, the integrity of the messages sent, and the fact of the sending by the sender, whereby to provide nearly identical, secure e-mail services to the subscriber whether the subscriber is using his/her own computer which is running the application or is logged-in to the server from a different computer through the Internet.

6. The method of claim 5, wherein the step of accessing the e-mail service from a computer other than the subscriber's computer further comprises the step of using an S/MIME compliant application to connect between the other computer and the server.

7. The method of claim 5, further comprising the step of decompressing any compressed attachment automatically when it reaches and is opened by a subscriber.

8. A secure, encrypted, digitally-certified e-mail service application for a personal computer that is also accessible for similar use over a global computer network, the service application comprising:

a full-featured e-mail program for loading onto a subscriber's personal computer, the program configured to receive personal information, settings, and files of the subscriber and having at least one of address book, e-mail account book, and message book files provided therein;

a network-based e-mail service system configured to shadow the subscriber's e-mail program as to content and having the same ones of address book, account book, and message book files as said program on said personal computer, the system synchronizing and updating itself and the program on the personal computer as and after either is changed and upon connecting the subscriber's personal computer to the e-mail service system via a modem or the network, and means for providing a digital signature security service directly from either of the subscriber's computer or the network server, the signature service verifying the identity of the sender, the integrity of the message, and the fact of the sending by the subscriber.

9. The e-mail service application of claim 8, wherein the server of the e-mail service is configured for access to any computer used by the subscriber using an S/MIME compliant application.

10. The e-mail service application of claim 8, wherein the service further is configured to decompress any compressed attachment automatically when it reaches and is opened by the subscriber.

* * * * *